US012654211B2

(12) United States Patent
Yamauchi

(10) Patent No.: US 12,654,211 B2
(45) Date of Patent: Jun. 16, 2026

(54) COATING MATERIAL SUPPLY DEVICE AND COATING MACHINE

(71) Applicant: ABB Schweiz AG, Baden (CH)

(72) Inventor: Kuniharu Yamauchi, Tokyo (JP)

(73) Assignee: ABB SCHWEIZ AG, Baden (CH)

( * ) Notice: Subject to any disclaimer, the term of this patent is extended or adjusted under 35 U.S.C. 154(b) by 469 days.

(21) Appl. No.: 18/463,714

(22) Filed: Sep. 8, 2023

(65) Prior Publication Data

US 2024/0109107 A1 Apr. 4, 2024

(30) Foreign Application Priority Data

Oct. 4, 2022 (JP) ................................ 2022-160325

(51) Int. Cl.

| | |
|---|---|
| ***B05B 15/55*** | (2018.01) |
| ***B05C 5/02*** | (2006.01) |
| ***B05C 11/10*** | (2006.01) |
| ***B08B 9/032*** | (2006.01) |

(52) U.S. Cl.

CPC ............ *B08B 9/0325* (2013.01); *B05B 15/55* (2018.02); *B05B 15/557* (2018.02); *B05C 5/027* (2013.01); *B05C 11/1036* (2013.01); *B08B 9/0328* (2013.01); *B08B 2209/032* (2013.01)

(58) Field of Classification Search

CPC ..... B08B 9/0325; B08B 9/0328; B05B 15/55; B05B 15/557

See application file for complete search history.

(56) References Cited

U.S. PATENT DOCUMENTS 5,221,047 A * 6/1993 Akeel ..................... B08B 9/055 239/104
2021/0283641 A1* 9/2021 Yamauchi ............ B05B 5/0415

FOREIGN PATENT DOCUMENTS

| | | | | |
|---|---|---|---|---|
| EP | 4011503 | A1 | 6/2022 | |
| JP | H06134359 | A | 5/1994 | |
| JP | 2010005544 | A | 1/2010 | |
| JP | 2019094393 | A | 6/2019 | |
| JP | 2020093220 | A | 6/2020 | |
| JP | 6979546 | B1 | 12/2021 | |
| KR | 20200013169 | A * | 2/2020 | ............ B05B 15/55 |

OTHER PUBLICATIONS

English machine translation of KR20200013169 (Year: 2020).*

* cited by examiner

*Primary Examiner* — Scott W Dodds

(74) *Attorney, Agent, or Firm* — Greenberg Traurig, LLP

(57) ABSTRACT

The coating material supply device has a coating material supply channel for supplying coating material and capable of cleaning at least the coating material supply channel by sending a cleaning liquid and cleaning air into the coating material supply channel. The device has a cleaning liquid supply unit for supplying the cleaning liquid to the coating material supply channel. The device includes a bubble generator for generating fine bubbles, an air supply unit for supplying the cleaning air to the coating material supply channel, and a cleaning control unit. The cleaning control unit alternately feeds the cleaning liquid containing the fine bubbles and the cleaning air into the coating material supply channel, by controlling to alternately drive the cleaning liquid supply unit and the air supply unit.

11 Claims, 8 Drawing Sheets

(a)

(b)

(a)

Verification 1

(b)

Verification 2

COATING MATERIAL SUPPLY DEVICE AND COATING MACHINE

CROSS-REFERENCE TO RELATED APPLICATIONS

This application claims priority to Japanese patent application Serial No.: 2022-160325, filed on Oct. 4, 2022; which is herein incorporated by reference in its entirety.

TECHNICAL FIELD

The present invention relates to a coating material supply device and a coating machine that supplies a coating material to a coating head installed in a coating machine or a cartridge that is detachably held in the coating machine.

BACKGROUND ART

Coating of objects, such as vehicle bodies of automobiles, is performed by supplying coating materials from, for example, a coating material tank where coating materials are stored to coating heads located at the tip of the arm of a coating robot used as a coating machine. In a coating robot, coating material tanks in which multiple colors of coating materials are stored for each color is connected to a color change valve device, and the coating material used for coating is selected by the color change valve device, and supplied to the coating machine, in order to respond to changes in the color of the coating material used to coat the object to be coated.

In such a coating machine, for example, when changing the coating material used to coat the object to be coated with another type of coating material along with a color change, a cleaning liquid is flowed from the color change valve device toward the coating machine to clean the coating material remaining in the color change valve device, the coating machine, and the flow path from the color change valve device to the coating machine (hereinafter referred to as supply path). Incidentally, when the cleaning liquid is flowed from the color change valve device towards the coating machine, the cleaning liquid is adversely affected by the pressure loss in the pipe that occurs near the inner wall surface of the coating material passage or supply path, and it is not possible to easily wash away the coating material that remains in the vicinity of the inner wall surface. For example, as a method to effectively wash away the coating material remaining in the coating material passage, it has been proposed to form a swirling flow with the cleaning liquid when cleaning the coating material passage with the cleaning liquid. (See Patent Literature 1).

In the invention of Patent Literature 1, a swirling flow of the cleaning liquid is generated, and the swirling flow effectively washes away the coating material remaining in the coating material passage, by rotating in the circumferential direction or vibrating in the radial direction the swirling flow forming member provided in the coating material passage provided in the color change valve device. Such a swirling flow forming member can be arranged not only in the color change valve device, but also in the supply path from the color change valve device to the coating machine and the coating machine, so that it is possible to effectively clean the supply path from the color change valve device to the coating machine.

PRIOR ART LITERATURE

Patent Literature (Patent Literature 1) Japanese Patent No. 5723448

SUMMARY OF THE INVENTION

Problem to be Solved by the Invention

However, since the supply path is equipped with pumps to stably supply coating material to the coating machine and filters to remove air bubbles and pigment clumps contained in the coating material, it is difficult to effectively wash away the coating material remaining inside the pump or inside the filter only by arranging the swirling flow forming member.

In addition, since the coating machine needs to dispense and spray the coating material onto the object to be coated in a stable manner, and is not a structure suitable for arranging the swirling flow forming member, it is difficult to effectively wash away the coating material remaining in the interior of the coating machine when cleaning the interior of the coating machine. Therefore, there is a need for techniques to effectively wash away the coating material remaining in the color change valve device, coating machines, and supply path between these pieces of equipment within a short period of time from the end of coating until the start of coating of the next object to be coated. The present invention was invented to solve the challenges described above and is intended to provide a coating material supply device or a coating machine capable of effectively washing away residual coating material in a short period of time.

Means for Solving the Problem

To solve the challenges described above, the coating material supply device of the present invention is the device that has a coating material supply channel for supplying coating materials and capable of cleaning at least the coating material supply channel by sending a cleaning liquid and cleaning air into the coating material supply channel, wherein the device has a cleaning liquid supply unit for supplying the cleaning liquid to the coating material supply channel; a bubble generator for generating fine bubbles containing at least one of microbubbles and nanobubbles to the cleaning liquid supplied to the coating material supply channel by the cleaning liquid supply unit; an air supply unit for supplying the cleaning air to the coating material supply channel; and a cleaning control unit for controlling the driving of the cleaning liquid supply unit and the driving of the air supply unit; where the cleaning control unit alternately feeds the cleaning liquid containing the fine bubbles and the cleaning air into the coating material supply channel, by controlling to alternately drive the cleaning liquid supply unit and the air supply unit.

A coating material supply device having a reservoir in which the coating material is stored; and a return flow path for returning, through the coating material supply channel, the coating material not used in the coating section, among the coating material supplied toward the coating section for coating the object to be coated, toward the reservoir; wherein the coating material supply channel and the return flow path, together with the coating section, constitute a coating material circulation channel for circulating the coating material between the reservoir and the coating section, and the cleaning control unit controls the driving of the cleaning liquid supply unit and the air supply unit for the cleaning liquid and the cleaning air, so as to feed in the same direction as the circulation direction of the coating material, or in the opposite direction to the circulation direction of the coating material.

In this case, the coating material circulation channel is preferably arranged with a plurality of circuit components, and a sorting means for segmenting the coating material circulation channel is provided between each of at least two adjacent circuit components of the plurality of circuit components, wherein the cleaning control unit controls the two sorting means, so as to send the cleaning liquid containing the fine bubbles and the cleaning air, in the flow path between any two sorting means and the circuit components located in the flow path, of the sorting means provided between each of the at least two adjacent circuit components.

In addition, the coating machine in the present invention comprises a coating material supply device described above, a coating section having an ejection surface arranged with a plurality of nozzles in a predetermined arrangement pattern, and coating the object to be coated by ejecting a coating material supplied by the coating material supply device from each of the plurality of nozzles.

In addition, this device has a holding section for detachably holding a cartridge filled with the coating material, coating material tanks for storing the coating material, a dispensing section for pumping the coating material stored in the coating material tank into the cartridge via the coating material supply channel from the coating material tank, and a coating material supply control unit for controlling supply of the coating material from the coating material tank to the cartridge, wherein the cleaning control unit cleans an interior of the coating material supply channel and the cartridge held in the holding section in response to the holding section holding the cartridge, and wherein the coating material supply control unit drives the dispensing section to fill the cartridge with the coating material stored in the coating material tank, in response to the holding section holding the cartridge.

In addition, the cleaning control unit controls to alternately drive the cleaning liquid supply unit and the air supply unit when it is time to clean the cartridge held by the holding section to clean the interior of the coating material supply channel and the cartridge by pumping the cleaning liquid containing fine bubbles and the cleaning air into the coating material supply channel and the cartridge.

In addition, this device has a switching unit that is connected to a plurality of coating material tanks provided in response to each of a plurality of types of coating materials, and that switches the coating material supplied to the coating material supply channel by connecting one of the coating material tanks to be connected to the coating material supply channel; and a switching control unit for controlling the switching unit; wherein the switching unit is connected to the cleaning liquid supply unit and the air supply unit, in addition to the plurality of coating material tanks, and the switching control unit controls the switching unit so as to sequentially switch between the connection of the coating material supply channel and the cleaning liquid supply unit and the connection of the coating material supply channel and the air supply unit when cleaning the coating material supply channel.

The cartridge is detachably attached to a coating machine that coats an object to be coated, where the cartridge has a delivery channel that, when mounted to the coating machine, pumps the coating material filled inside towards the coating section that the coating machine has.

Effect of the Invention

According to the present invention, at least coating materials remaining in the coating material supply channel can be effectively washed away in a short time.

BRIEF DESCRIPTION OF THE DRAWINGS

FIG. 1(*b*) is a side view of the coating robot shown in FIG. 1(*a*).

BEST MODE FOR CARRYING OUT THE INVENTION

First Embodiment

The coating machine 10 in the first embodiment of the present invention will be described below based on the drawings. A coating machine 10 according to the first embodiment is arranged, for example, in the lateral direction of a coating line in an automobile manufacturing plant and is used for coating a vehicle body B conveyed along the coating line.

Moreover, in this first embodiment, the object to be coated by the coating machine 10 (hereinafter referred to as the "object to be coated") is a vehicle body B that will be described as an example, but the object to be coated may also be an automobile part other than a vehicle body B (examples include, but are not limited to, doors, hoods, various panels, etc.), or various parts other than automobile parts (for example, airplane or railway exterior parts), and thus is not limited to a vehicle body of an automobile and may be any object that requires coating.

Coating here is performed for the purpose of forming a coating film on the surface of the object to be coated to provide protection of that surface and improved appearance. Therefore, coating includes not only the coating of an object to be coated using coating material of a specific color or coating material having a specific function, but also the coating of an object to be coated using coating materials of multiple colors in sequence. Furthermore, coating includes coating of patterns, illustrations, images, etc.

Figure 1:
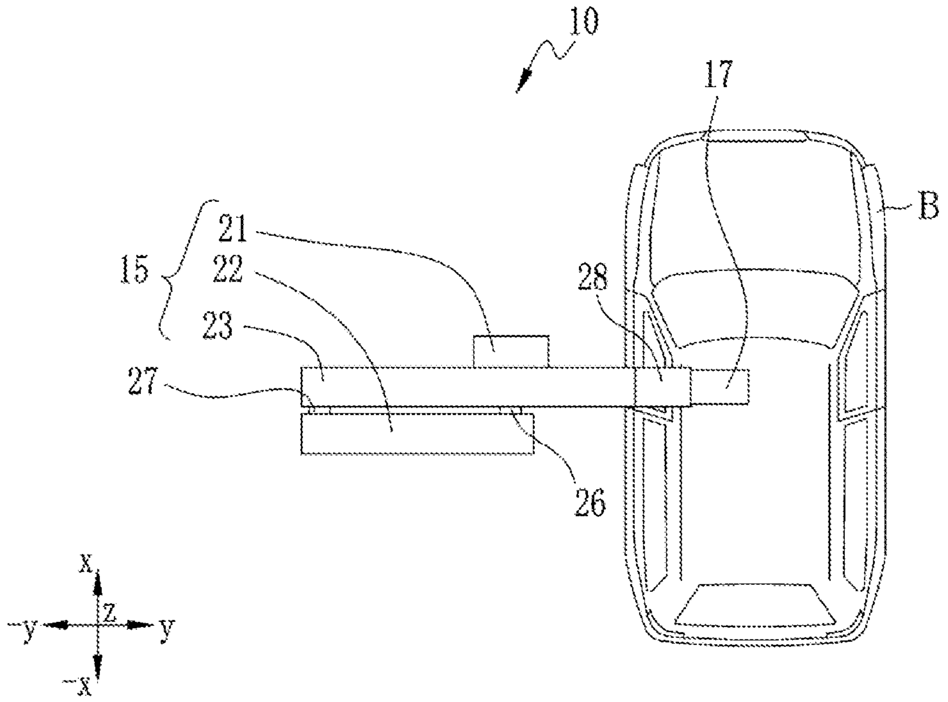
FIG. 1(*a*) is a top view illustrating one configuration of a coating machine provided with a coating material supply device in the first embodiment.
Figure 1:
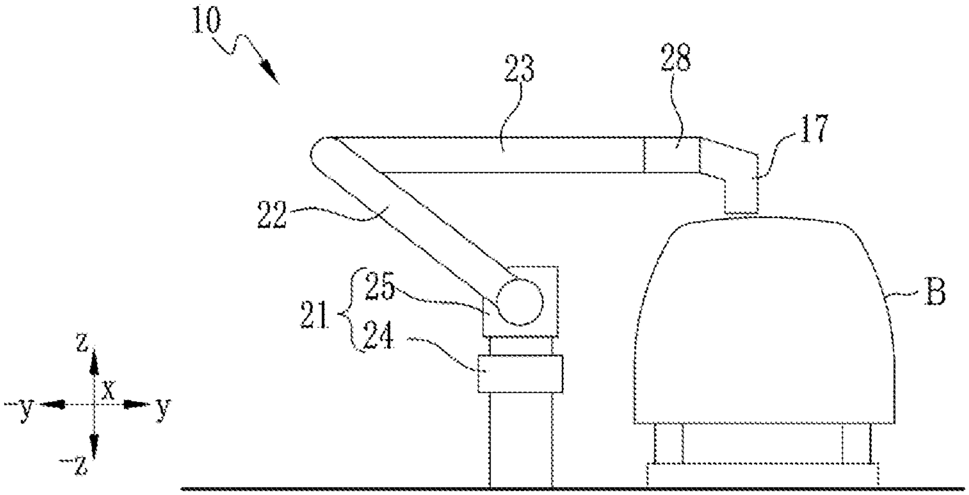

As shown in FIGS. 1(*a*) and 1(*b*), the coating machine 10 has, by way of example, a robot arm 15 and a coating head unit 17. The robot arm 15 comprises a base 21 and a multi-axis arm composed of a plurality of (two in FIG. 1) arm members 22 and 23. The base 21 comprises a fixed portion 24 and a rotating portion 25 rotatable relative to the fixed portion 24. The fixed portion 24 has a motor, not shown, and rotates the rotating portion 25 as a rotation center in a direction perpendicular to the floor surface of the coating line (z-axis direction in FIG. 1).

Hereinafter, among the multiple arm members 22, 23, the arm member 22 coupled to the rotating portion 25 is referred to as the first rotary arm 22, and the arm member 23 coupled to the first rotary arm 22 is referred to as the second rotary arm 23.

The first rotary arm 22 is coupled to the movable shaft portion 26 provided in the rotating portion 25 at one end in the direction of extension of the first rotary arm 22. The movable shaft portion 26 provided in the rotating portion 25 is provided with a motor, not shown, to cause the first rotary arm 22 to rotate on a plane orthogonal to the floor surface of the coating line (that is, a yz plane when the robot arm 15 is in the state of FIG. 1(*b*)).

In the direction of extension of the first rotary arm 22, the second rotary arm 23 is coupled via the movable shaft portion 27 to the other end, which is opposite to the one end coupled to the movable shaft portion 26 of the rotating portion 25. The movable shaft portion 27 is provided with a motor, not shown, to cause the second rotary arm 23 to rotate on a plane orthogonal to the floor surface of the coating line (that is, a yz plane when the robot arm 15 is in the state of FIG. 1(*b*)). Moreover, although the illustration is omitted, the center axis of the movable shaft portion 26 of the rotating portion 25 and the center axis of the movable shaft portion 27 provided in the first rotary arm 22 are parallel.

The other end of the second rotary arm 23 in the direction of extension is provided with a wrist portion 28. The wrist portion 28 holds the coating head unit 17. The wrist portion 28 has multiple motors, not shown, each with a different axis direction of the drive shaft, and driving any of these motors causes the held coating head unit 17 to rotate using any one of the multiple shafts that the wrist portion 28 has as a rotation center. It should be noted that the number of shafts should be two or more.

The coating head unit 17 comprises a coating head 36 as described below, a head control unit (not shown) for controlling operation of said coating head 36, and the like.

Figure 2:
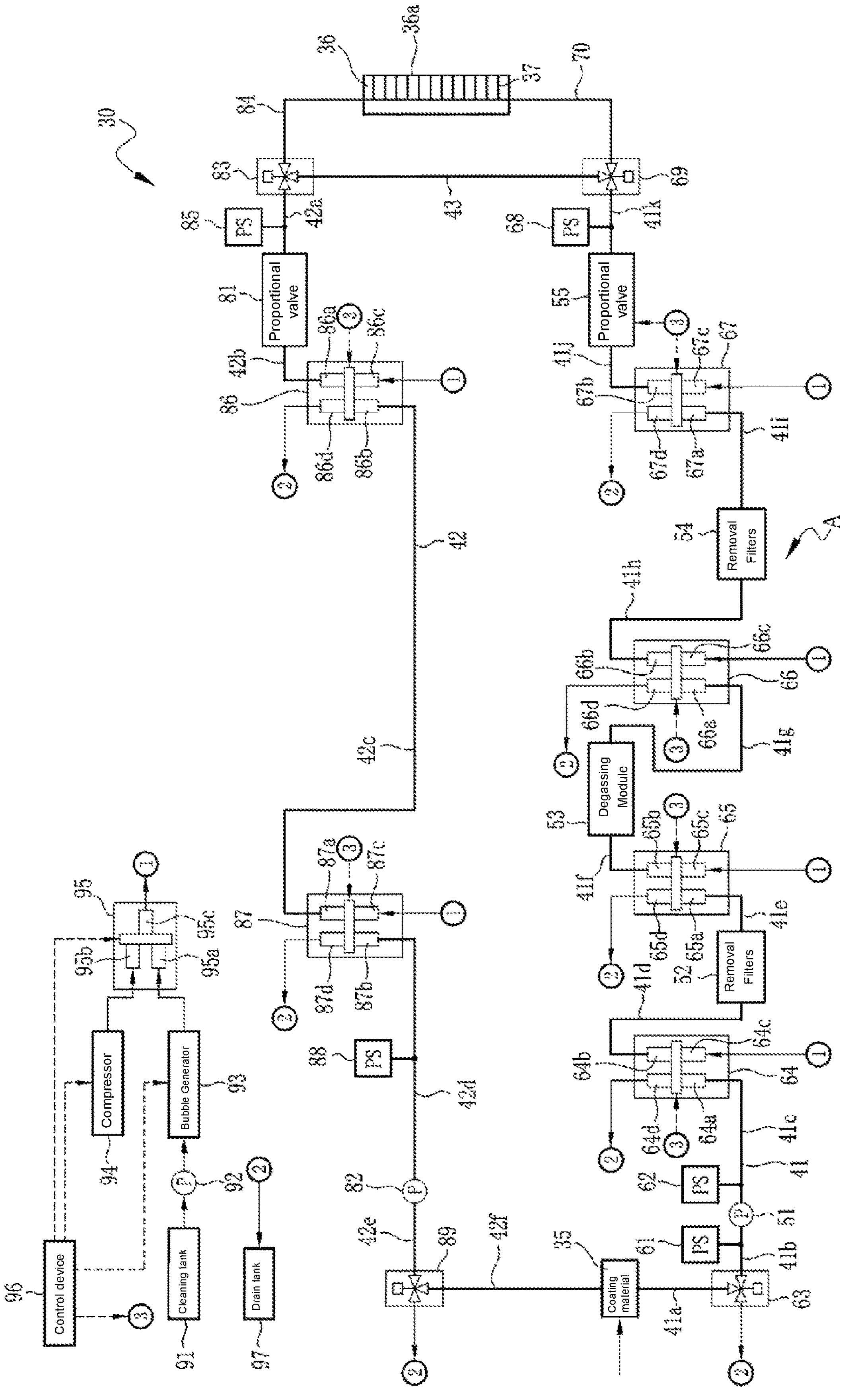
FIG. 2 is a diagram showing an example of a schematic of a coating material supply device.

As described above, a coating material supply device 30 is provided inside the second rotary arm 23. As shown in FIG. 2, the coating material supply device 30 circulates coating material between the coating material tank 35 and the coating head 36 by supplying coating materials stored in the coating material tank 35 to the coating head 36 when coating the vehicle body B and returning coating materials not used in the coating head 36 from the coating head 36 to the coating material tank 35. In addition, when the coating material supply device 30 is not coating the vehicle body B, the coating material stored in the coating material tank 35 flows through the supply path 41, bypass flow path 43, and return flow path 42, in that order, and the coating material is circulated between a coating material tank 35 and a coating head 36.

It should be noted that, coating materials used for coating the vehicle body B are, for example, water-based coating materials and solvent-based coating materials using pigments. Thus, by circulating the coating material by the coating material device 30, separation of the pigments contained in the coating material and agglomerating of the pigments is prevented. The coating material may be a dye-based coating material using a dye instead of a pigment-based coating material using a pigment.

The configuration of the coating material device 30 provided in the coating machine 10 will be described below. In FIG. 2, flow paths are shown in solid lines, and electrical and pneumatic signal flow is shown in dotted lines.

As shown in FIG. 2, the coating material supply device 30 has, for example, a supply path 41 that supplies coating materials stored in the coating material tank 35 to the coating head 36, and a return flow path 42 that returns coating material not used in the coating head 36 to the coating material tank 35 from the coating head 36, and a bypass flow path 43 that flows from the supply path 41 to the return flow path 42 without supplying coating material to the coating head 36. The supply path 41, return flow path 42, and bypass flow path 43 together with the coating head 36 constitute a coating material circulation channel A. Here, the supply path 41 corresponds to the coating material supply channel described in the claims.

When describing the configuration of the supply path 41 of coating material supply device 30, the coating material tank 35 side is the upstream side and the coating head 36 side is the downstream side in the coating material supply direction. In addition, in describing the configuration of the return flow path 42 of the coating material supply device 30, the side of the coating head 36 may be referred to as the upstream side and the side of the coating material tank 35 may be referred to as the downstream side.

The coating material tank 35 stores the coating material used for coating the vehicle body B using the coating head 36. In addition, the coating material tank 35 corresponds to the reservoir described in the claims. The coating material tank 35 is arranged outside the coating robot (for example, on the floor of the coating room). Moreover, the coating material tank 35 is supplied with coating material from outside as necessary in the process of coating the vehicle body B using the coating head 36. As described above, coating material flowing through the return flow path 42 flows into the coating material tank 35. When the coating material that has flowed through the return flow path 42 flows into the coating material tank 35, air bubbles flow together with the coating material and float on the liquid surface in the coating material tank 35. Thus, the coating material tank 35 may have the function to remove air bubbles floating on the liquid surface.

The coating head 36 has a nozzle forming surface 36*a* with multiple nozzles 37 arranged in a two-dimensional array, and the coating material supplied via the supply path 41 is discharged from each of the multiple nozzles 37 to form a coating film on the surface of the vehicle body B. The coating head 36 corresponds to the coating section as described in the claims. The nozzle forming surface 36*a* corresponds to the ejection surface as described in the claims.

Although coating head 36 is an inkjet-type coating head that ejects coating material droplets, for example, by driving a piezoelectric element, coating head 36 may be another on-demand type of coating head, such as a thermal type. The coating head 36 may be a continuous type coating head rather than a drop-on-demand type.

The supply path 41 is a flow path that supplies coating materials stored in the coating material tank 35 to the coating head 36. A gear pump 51, a removal filter 52, a degassing module 53, a removal filter 54, and a proportional valve 55 are arranged in the middle of the supply path 41, which functions as a circuit component, starting from the upstream side.

The gear pump 51 draws in the coating material stored in the coating material tank 35 and feeds the drawn-in coating material toward the coating head 36. The gear pump 51 is driven and controlled by the control device 96 described below. Therefore, when gear pump 51 is driven, the pressure on the upstream side of the gear pump 51, that is, inside the flow paths 41*a* and 41*b* between the coating material tank 35 and the gear pump 51, becomes negative, and the coating material stored in the coating material tank 35 is drawn into the flow paths 41*a* and 41*b*. The drawn-in coating material is then pumped downstream of the gear pump 51.

The flow path 41*b* on the input side of the gear pump 51 and the flow path 41*c* on the output side are each provided with a pressure gauge (PS) 61, 62. The pressure gauge 61 detects the pressure of the coating material flowing through the flow path 41*b*. The pressure gauge 62 detects the pressure of the coating material flowing through the flow path 41*c*. Therefore, the gear pump 51 is driven and controlled based on the pressures detected by the pressure gauges 61 and 62 so that the pressure value of the coating material to be delivered is constant.

Three-way valve 63 is provided between coating material tank 35 and gear pump 51, that is, flow paths 41*a*, 41*b*. The three-way valve 63 is switched and controlled by the control device 96. The three-way valve 63 can be switched to either a state in which the flow path 41*a* is in communication with the flow path 41*b* or a state in which the flow path 41*b* is in communication with a drain path (not show) connected to the drain tank 97. For example, when a coating material is supplied, the three-way valve 63 is kept in a state in which the flow path 41*a* is in communication with flow path 41*b*. In addition, when cleaning the interior of the supply path 41, the three-way valve 63 is switched to a state in which the flow path 41*b* is in communication with a drain channel (not shown) connected to the drain tank 97.

A switching valve 64 is provided at the downstream side end of the flow path 41*c*. The switching valve 64 has four valves 64*a*, 64*b*, 64*c* and 64*d*. Of these valves 64*a*, 64*b*, 64*c*, 64*d*, for example, valve 64*a* is connected to a downstream end of flow path 41*c*, and valve 64*b* is connected to an upstream end of flow path 41*d* towards removal filter 52. In addition, the valve 64*c* is connected to a flow path (not shown) from the manifold 95. Further, valve 64*d* is connected to a flow path (not shown) connected to drain tank 97. These valves 64*a*, 64*b*, 64*c*, 64*d* are controlled to open and close by a control device 96. It should be noted that the switching valve 64 corresponds to the sorting means described in the claims.

For example, when a coating material is supplied, of the valves 64*a*, 64*b*, 64*c*, 64*d* of the switching valve 64, the valves 64*a*, 64*b* are kept open, while the valves 64*c*, 64*d* are kept closed.

In addition, when cleaning the coating material supply device 30, the valves 64*a*, 64*b*, 64*c*, 64*d* of the switching valve 64 are controlled to open and close in accordance with the direction in which the cleaning liquid and air flow. For example, if the cleaning liquid or air is flowed from the switching valve 64 toward the three-way valve 63, valves 64*a*, valve 64*c* are kept open, while valves 64*b*, 64*d* are kept closed. Further, if the cleaning liquid or air is flowed from the three-way valve 63 toward the switching valve 64, the valves 64*a* and 64*d* are kept open, while the valves 64*b* and 64*c* are kept closed.

In addition, for example, if the cleaning liquid or air is flowed from the switching valve 64 toward the switching valve 65, the valves 64*b*, 64*c* are kept open, while the valves 64*a*, 64*d* are kept closed. In addition, if the cleaning liquid or air is flowed from the switching valve 65 toward the switching valve 64, the valves 64*b*, 64*s* are kept open, while the valves 64*a*, 64*c* are kept closed.

A removal filter 52 is provided downstream of the flow path 41*d* connected to the valve 64*b* of the switching valve 64. The removal filter 52 removes foreign matter such as coarse particles and pigment agglomerates contained in the coating material, as well as bubbles that exceed a predetermined size among the bubbles contained in the coating material. The removal filter 52 is, for example, a mesh-like body such as a metal net or resin net, or a porous body, or a metal plate in which fine through-holes have been formed. Examples of a mesh-like body include metal mesh filters, metal fibers, e.g. fine strands of metal known as SUS made into the form of felt, metal sintered filters which have been compressed and sintered, electroformed metal filters, electron beam processed metal filters, laser beam processed metal filters, and the like.

A switching valve 65 is provided downstream of the flow path 41*e* connected to the output side of the removal filter 52. Similarly to the switching valve 64, the switching valve 65 has four valves 65*a*, 65*b*, 65*c*, and 65*d*. For example, the valve 65*a* is connected to the downstream end of the flow path 41*e*, and the valve 65*b* is connected to the upstream end of the flow path 41*f* toward the degassing module 53. The valve 65*c* is connected to a flow path (not shown) from the manifold 95. Further, valve 65*d* is connected to a flow path (not shown) connected to drain tank 97. These valve 65*a*, 65*b*, 65*c*, 65*d* are controlled to open and close by a control device 96. It should be noted that the switching valve 65 corresponds to the sorting means described in the claims.

For example, when a coating material is supplied, of the valves 65*a*, 65*b*, 65*c*, and 65*d* of the switching valves 65, the valve 65*a* and 65*b* are kept open, while the valves 65*c* and 65*d* are kept closed.

When cleaning the coating material supply device 30, the valves 65*a*, 65*b*, 65*c*, and 65*d* of the switching valve 65 are controlled to open and close in accordance with the direction in which the cleaning liquid and air are supplied. For example, if the cleaning liquid or air is flowed from the switching valve 64 toward the switching valve 65, the valves 65*a* and 65*d* are kept open, while the valves 65*b* and 65*c* are kept closed. Further, if the cleaning liquid or air is allowed to flow from the switching valve 65 toward the switching valve 64, the valves 65*a* and 65*c* are kept open, while the valves 65*b* and 65*d* are kept closed.

Further, for example, if the cleaning liquid or air is allowed to flow from the switching valve 65 toward the switching valve 66, the valves 65*b* and 65*c* are kept open, while the valves 65*a* and 65*d* are kept closed. Further, if the cleaning liquid or air is allowed to flow from the switching valve 66 toward the switching valve 65, the valves 65*b* and 65*d* are kept open, while the valves 65*a* and 65*c* are kept closed.

A degassing module 53 is provided downstream of the flow path 41*f* connected to the valve 65*b* of the switching valve 65. The degassing module 53 removes (degasses) dissolved gas and air bubbles present in the coating material. Examples of the degassing module 53 include a hollow fiber membrane bundle made by bundling multiple hollow fiber membranes.

A switching valve 66 is provided downstream of the flow path 41*g* connected to the output side of the degassing module 53. Similarly to the switching valves 64 and 65, the switching valve 66 has four valves 66*a*, 66*b*, 66*c* and 66*d*. For example, the valve 66*a* is connected to the downstream end of the flow path 41*g*, and the valve 66*b* is connected to the upstream end of the flow path 41*h* toward the removal filter. The valve 66*c* is connected to a flow path (not shown) from the manifold 95. Further, valve 66*d* is connected to a flow path (not shown) connected to drain tank 97. These valves 66*a*, 66*b*, 66*c*, 66*d* are controlled to open and close by a control device 96. It should be noted that the switching valve 66 corresponds to the sorting means described in the claims.

For example, when a coating material is supplied, of the valves 66*a*, 66*b*, 66*c*, 66*d* of the switching valve 66, the valves 66*a*, 66*b* are kept open, while the valves 66*c*, 66*d* are kept closed.

In addition, when cleaning the coating material supply device 30, the valves 66*a*, 66*b*, 66*c*, 66*d* of the switching valve 66 are controlled to open and close in accordance with the direction in which the cleaning liquid and air are supplied. For example, if the cleaning liquid or air is flowed from the switching valve 65 towards the switching valve 66, the valves 66*a*, 66*d* are kept open, while the valves 66*b*, 66*c* are kept closed. In addition, if the cleaning liquid or air is flowed from the switching valve 66 toward the switching valve 65, the valves 66*a*, 66*c* are kept open, while the valves 66*b*, 66*d* are kept closed.

Moreover, for example, if the cleaning liquid or air is flowed from the switching valve 66 toward the switching valve 67, the valves 66*b* and 66*c* are kept open, while the valves 66*a* and 66*d* are kept closed. Further, if the cleaning liquid or air is flowed from the switching valve 67 toward the switching valve 66, the valves 66*b* and 66*d* are kept open, while the valves 66*a* and 66*c* are kept closed.

A removal filter 54 is provided downstream of the flow path 41*h* connected to the valve 66*b* of the switching valve 66. The removal filter 54 has the same structure as the removal filter 52. Thus, the description of the removal filter 54 is omitted below.

A switching valve 67 is provided downstream of the flow path 41*i* connected to the output side of the removal filter 54. Similarly to the switching valves 64, 65, 66, the switching valve 67 has four valves 67*a*, 67*b*, 67*c*, 67*d*. For example, the valve 67*a* is connected to the downstream end of the flow path 41*i* and the valve 67*b* is connected to the upstream end of the flow path 41*j* toward the proportional valve 55. In addition, the valve 67*c* is connected to a flow path (not shown) from the manifold 95. Further, valve 67*d* is connected to a flow path (not shown) connected to drain tank 97. These valves 67*a*, 67*b*, 67*c*, 67*d* are controlled to open and close by a control device 96. It should be noted that the switching valve 67 corresponds to the sorting means described in the claims.

For example, of the valves 67*a*, 67*b*, 67*c*, and 67*d* of the switching valve 67, the valves 67*a* and 67*b* are kept open, while the valves 67*c* and 67*d* are kept closed.

In addition, when cleaning the coating material supply device 30, the valves 67*a*, 67*b*, 67*c*, and 67*d* of the switching valve 67 are controlled to open and close in accordance with the direction of flow of the cleaning liquid and air. For example, if the cleaning liquid or air is flowed from the switching valve 66 toward the switching valve 67, the valves 67*a* and 67*d* are kept open, while the valves 67*b* and 67*c* are kept closed. In addition, if the cleaning liquid or air is flowed from the switching valve 67 toward the switching valve 66, the valves 67*a* and 67*c* are kept open, while the valves 67*b* and 67*d* are kept closed.

In addition, for example, if the cleaning liquid or air is flowed from the switching valve 67 toward the switching valve 86, the valves 67*b*, 67*c* are kept open, while the valves 67*a*, 67*d* are kept closed. In addition, if the cleaning liquid or air is flowed from the switching valve 86 toward the switching valve 67, valves 67*b*, 67*d* are kept open, while valves 67*a*, 67*c* are kept closed.

A proportional valve 55 is provided downstream of the flow path 41*j* connected to the valve 67*b* of the switching valve 67. The proportional valve 55 is controlled to open and close by the controller 96 so that the pressure value detected by the pressure gauge 68 provided in the flow path 41*k* connected to the output side of the proportional valve 55, that is, the pressure value of the coating material flowing downstream of the proportional valve 55, is constant.

A three-way valve 69 is attached to the downstream end of the flow path 41*k*. The three-way valve 69 is connected to a flow path 41*k*, an input side flow path 70 of the coating head 36, and an upstream end of the bypass flow path 43. The three-way valve 69 is switched and controlled by the control device 96. For example, three-way valve 69 maintains flow path 41*k* and flow path 70 in communication when coating the vehicle body B. In addition, the three-way valve 69 maintains the flow path 41*k* and the bypass flow path 43 in communication when the vehicle body B is not coated.

The return flow path 42 is a flow path for returning the coating material not used in the coating head 36 and the coating material flowing through the bypass flow path 43 toward the coating material tank 35. A proportional valve 81 and a gear pump 82 functioning as circuit components are arranged in order from the upstream side in the middle of the return flow path 42.

A three-way valve 83 is attached to the upstream end of the flow path 42*a* of the return flow path 42. The three-way valve 83 is connected to the output-side flow path 84 of the coating head 36 and the downstream end of the bypass flow path 43 in addition to the flow path 42*a*. The three-way valve 83 is switched and controlled by the control device 96. For example, when coating the vehicle body B, the three-way valve 83 maintains the passage 42*a* and the passage 84 on the output side of the coating head 36 in communication. Further, the three-way valve 83 maintains the flow path 42*a* and the bypass flow path 43 in communication when the vehicle body B is not coated.

A pressure gauge 85 is connected to the flow path 42*a*. A pressure gauge 85 measures the pressure of coating material flowing from the coating head 36 upstream of the proportional valve 81 toward the proportional valve 81.

A proportional valve 81 is arranged downstream of the pressure gauge 85 in the flow path 42*a*. The proportional valve 81 is controlled to open and close by the control device 96, and maintains a constant pressure value of the coating material flowing through the flow path 42*a*.

A switching valve 86 is provided downstream of the flow path 42*b* connected to the output side of the proportional valve 81. Similarly to the switching valves 64, 65, 66 and 67 provided in the supply path 41, the switching valve 86 has four valves 86*a*, 86*b*, 86*c* and 86*d*. For example, the valve 86*a* is connected to the downstream end of the flow path 42*b*, and the valve 86*b* is connected to the upstream end of the flow path 42*c*. The valve 86*c* is connected to a flow path (not shown) from the manifold 95. Further, valve 86*d* is connected to a flow path (not shown) connected to drain tank 97. These valves 86*a*, 86*b*, 86*c*, 86*d* are controlled to open and close by a control device 96. It should be noted that the switching valve 86 corresponds to the sorting means described in the claims.

For example, when a coating material is supplied, of the valves 86*a*, 86*b*, 86*c*, and 86*d* of the switching valve 86, the valves 86*a* and 86*b* are kept open, while the valves 86*c* and 86*d* are kept closed.

Further, when cleaning the coating material supply device 30, the four valves 86*a*, 86*b*, 86*c*, and 86*d* of the switching valve 86 are controlled to open and close in accordance with the direction in which the cleaning liquid and air are supplied. For example, if the cleaning liquid or air is flowed from the switching valve 67 toward the switching valve 86, the valves 86*a* and 86*d* are kept open, while the valves 86*b* and 86*c* are kept closed. Further, if the cleaning liquid or air is flowed from the switching valve 86 toward the switching valve 67, the valves 86*a* and 86*c* are kept open, while the valves 67*b* and 67*d* are kept closed.

Further, for example, if the cleaning liquid or air is flowed from the switching valve 86 toward the switching valve 87, the valves 86*b* and 86*c* are kept open, while the valves 86*a* and 86*d* are kept closed. Further, if the cleaning liquid or air is flowed from the switching valve 87 toward the switching valve 86, the valves 86*b* and 86*d* are kept open, while the valves 86*a* and 86*c* are kept closed.

A switching valve 87 is provided at the downstream end of the flow path 42*c*. Similarly to the switching valves 64, 65, 66 and 67 provided in the supply path 41, the switching valve 87 has four valves 87*a*, 87*b*, 87*c* and 87*d*. For example, the valve 87*a* is connected to the downstream end of the flow path 42*c*, and the valve 87*b* is connected to the upstream end of the flow path 42*d*. In addition, the valve 87*c* is connected to a flow path (not shown) from the manifold 95. Further, valve 87*d* is connected to a flow path (not shown) connected to drain tank 97. These valves 87*a*, 87*b*, 87*c*, 87*d* are controlled to open and close by a control device 96. It should be noted that the switching valve 87 corresponds to the sorting means described in the claims.

For example, when a coating material is supplied, of the valves 87*a*, 87*b*, 87*c*, and 87*d* of the switching valve 87, the valves 87*a* and 87*b* are kept open, while the valves 87*c* and 87*d* are kept closed.

When cleaning the coating material supply device 30, the valves 87*a*, 87*b*, 87*c*, and 87*d* of the switching valve 87 are controlled to open and close in accordance with the direction in which the cleaning liquid and air are supplied. For example, if the cleaning liquid or air is flowed from the switching valve 86 toward the switching valve 87, the valves 87*a* and 87*d* are kept open, while the valves 87*b* and 87*c* are kept closed. Further, if the cleaning liquid or air is flowed from the switching valve 87 toward the switching valve 86, the valves 87*a* and 87*c* are kept open, while the valves 87*b* and 87*d* are kept closed.

Further, for example, if the cleaning liquid or air is allowed to flow from the switching valve 87 toward the three-way valve 89, the valves 87*b* and 87*c* are kept open, while the valves 87*a* and 87*d* are kept closed. Further, if the cleaning liquid or air is flowed from the three-way valve 89 side toward the switching valve 87, the valves 87*b* and 87*d* are kept open, while the valves 87*a* and 87*c* are kept closed.

The flow path 42*d* is provided with a pressure gauge 88. The pressure gauge 88 detects the pressure of the coating material flowing through the flow path 42*d*.

A gear pump 82 is provided at the downstream end of the flow path 42*d*. The gear pump 82 is driven and controlled by the control device 96 such that the value of the pressure of the coating material flowing through the flow path 42*d*, that is, the pressure value detected by the pressure gauge 88, is constant. When the gear pump 82 is driven, the pressure on the upstream side of the gear pump 82, that is, the interior of the flow path 42*d*, is negatively pressured and a coating material is drawn into the flow path 42*d*. The coating material drawn into the flow path 42*d* is pumped towards the coating material tank 35.

A three-way valve 89 is connected to the downstream side of the flow path 42*e* connected to the output side of the gear pump 82. The three-way valve 89 is switched and controlled by the control device 96. The three-way valve 89 can be switched to either a state in which the flow path 42*e* is in communication with the flow path 42*f* connected to the coating material tank 35 or a state in which the flow path 42*e* is in communication with a drainage path (not shown) connected to the drain tank 97. For example, when a coating material is supplied, the three-way valve 89 is kept in a state in which the flow path 42*e* is in communication with the flow path 42*f*. In addition, when cleaning the interior of the return flow path 42, the three-way valve 89 is switched to a state in which the flow path 42*e* is in communication with a drain channel (not shown) connected to the drain tank 97.

Using the coating material supply device 30 described above, when cleaning the coating material supply device 30, the cleaning liquid from the cleaning tank 91 or the cleaning air from the compressor 94 (hereinafter sometimes referred to as air) is supplied from any one of the switching valves 64, 65, 66, 67 to the supply path 41 or from any of the switching valves 86, 87 to the return flow path 42.

The cleaning tank 91 stores cleaning liquids, such as, for example, cleaning thinners. The pump 92 is driven and controlled by a control device 96. The pump 92 draws the accumulated cleaning liquid into the cleaning tank 91 and pumps the drawn-in cleaning liquid to the manifold 95. The bubble generator 93 is a device that generates ultrafine bubbles in a cleaning liquid pumped from the pump 92 to the manifold 95. The bubble generator 93 is driven and controlled by the control device 96. It should be noted that an ultrafine bubble is, for example, bubbles (nanobubbles) with a diameter of about 1 μm or less. Ultrafine bubbles are negatively charged and have the property of adsorbing positively charged objects such as dirt and foreign matter. It should be noted that the pump 92 corresponds to the cleaning liquid supply unit as described in the claims.

Although the bubble generator 93 is a device that generates ultrafine bubbles (nanobubbles), for example, it may be a device that generates fine bubbles (microbubbles) with a diameter of 10 to 100 μm. In addition, the bubble generator 93 may be an device that generates fine bubbles (microbubbles) along with ultrafine bubbles (nanobubbles). While microbubbles have the same negatively charged properties as nanobubbles, they have larger diameter than nanobubbles, so they disappear from liquids such as cleaning liquids. Therefore, when microbubbles are used instead of nanobubbles, it can be used to individually clean each section described below, instead of cleaning the supply path 41, coating head 36, and return flow path 42 of the coating material supply device 30 at once.

Methods for generating ultrafine bubbles or fine bubbles in a cleaning liquid include, for example, a method of dispersing nanobubbles in a liquid by passing air through nanobubble-sized fine pores, a method of pulverizing gas into nanobubbles by passing a mixture of gas and liquid through a tube with protrusions and obstacles installed inside, and a method of precipitating nanobubbles by depressurizing a solution that has been supersaturated with gas in advance.

Compressor 94 is driven and controlled by control device 96. Compressor 94 pumps cleaning air (hereinafter referred to as air) towards manifold 95 described below. Here, the compressor 94 corresponds to the air supply unit described in the claims.

The manifold 95 comprises a plurality of valves including, for example, valve 95*a* to which a flow path (not shown) extending from cleaning tank 91 is connected, valve 95*b* to which a flow path (not shown) extending from compressor 94 is connected, and valve 95*c* to which flow paths extending to each of the switching valves 64, 65, 66, 67, 86, 87 described above is connected. These plurality of valves are individually controlled to open and close by the control device 96. The cleaning liquid from the cleaning tank 91 and the air from the compressor 94 are alternately fed into the supply path 41 and return flow path 42 of the coating material supply device 30 by the valve opening and closing control of the manifold 95.

The control device 96 provides drive control of the gear pumps 51, 82, proportional valves 55, 81, switching valves 64, 65, 66, 67, 86, 87, and three-way valves 63, 89, as well as the pump 92, bubble generator 93, compressor 94, and manifold 95 that the coating material supply device 30 has. Here, the control device 96 corresponds to the cleaning control unit described in the claims.

In addition, the control device 96 performs drive control of the gear pump 51 based on the pressure values of the coating material detected at the pressure gauge 61 and the pressure gauge 62, and adjusts the amount of coating material to be delivered. Similarly, the control device 96 performs drive control of the gear pump 82 based on the pressure value of the coating material detected by the pressure gauge 88, and adjusts the amount of coating material to be delivered.

In addition, the control device 96 controls the opening and closing of the proportional valve 55 based on the pressure value of the coating material detected at the pressure gauge 68, and adjusts the amount of coating material to be delivered. Similarly, the control device 96 performs opening and closing control of the proportional valve 81 based on the pressure value of the coating material detected at the pressure gauge 85, and adjusts the amount of coating material to be delivered.

The coating machine 10 in the first embodiment places, among the components constituting the coating material supply device 30 described above, for example, coating material tank 35, gear pumps 51, 82 on the floor of the coating room, and stores, for example, control valves such as proportional valves 55, 81, switching valves 64, 65, 66, 67, 86, 87, and the like inside the second rotary arm 23, in addition to the removal filters 52 and 54 and the degassing module 53. It should be noted that the gear pumps 51, 82 may adopt a configuration such that, for example, they are stored in the interior of the second rotary arm 23, rather than being placed on the floor of the coating room. In addition, a configuration in which at least one of the removal filters 52, 54, the degassing module 53, the control valves such as the proportional valves 55, 81 and the switching valves 64, 65, 66, 67, 86, 87, and the like, is placed on the floor may be employed.

With the above-described coating material supply device 30, in addition to being able to simultaneously clean the supply path 41, coating head 36, and return flow path 42 described above, it is also possible to divide each of the supply path 41 and return flow path 42 into a plurality of sections in advance and to clean each individual section separately. It should be noted that the multiple sections are, for example, a section from the three-way valve 63 to the switching valve 64 via the gear pump 51, a section from the switching valve 64 to the switching valve 65 via the removal filter 52, a section from the switching valve 65 to the switching valve 66 via the degassing module 53, a section from the switching valve 66 to the switching valve 67 via the removal filter 54, a section from the switching valve 67 to the switching valve 86 via the coating head 36, a section from the switching valve 86 to the switching valve 87, and a section from the switching valve 87 to the three-way valve 89 via the gear pump 82. It should be noted that the section from the switching valve 86 to the three-way valve 89 via the gear pump 82 was set as two sections, the upstream section and the downstream section, of the switching valve 87, but it may be one section.

Below, when cleaning the coating material supply device 30, the cleaning liquid and air may flow in the same direction as the direction in which the coating material flows, or in the opposite direction to the direction in which the coating material flows. Hereinafter, when the cleaning liquid and air flow in the same direction as the coating material supply, it is sometimes referred to as forward cleaning, and when the cleaning liquid and air flow in the opposite direction as the coating material supply, it is sometimes referred to as reverse cleaning.

Cases when cleaning the section from the switching valve 66 to the switching valve 67 via the removal filter 54, for example, among the sections set in the coating material supply device 30 will be described below. First, cases when cleaning the section in the forward cleaning will be described. When forward cleaning, the control device 96 closes the valves 66*a*, 66*d* of the switching valve 66 and opens the valves 66*b*, 66*c*. At the same time, the control device 96 closes the valves 67*b*, 67*c* of the switching valve 67 and opens the valves 67*a*, 67*d*. The control device 96 opens the valves 95*a*, 95*c* of the manifold 95.

In this state, the control device 96 drives the pump 92 and the bubble generator 93. This draws the cleaning liquid stored in the cleaning tank 91 into the pump 92 and pumps it towards the manifold 95. As described above, the bubble generator 93 is driven along with the pump 92. Therefore, the cleaning liquid pumped by the pump 92 is in a state where ultrafine bubbles are generated by the bubble generator 93.

The cleaning liquid comprising the ultrafine bubbles flows through the valves 66*c*, 66*b* of the switching valve 66 in the order of flow path 41*h*, removal filter 54, and flow path 41*i*. As noted above, the ultrafine bubbles in the cleaning liquid are negatively charged. Therefore, ultrafine bubbles contained in the cleaning liquid flowing from the switching valve 66 to the switching valve 67 adsorb dirt such as coating material adhered to the interior of the flow paths 41*h*, 41*i* and the removal filter 54. The cleaning liquid containing the ultrafine air bubbles adsorbed with dirt is then flowed in the order of flow path 41*h*, removal filter 54, and flow path 41*i*, and then discharged to drain tank 97 via valves 67*a*, 67*d* of switching valve 67.

When time T1 (see FIG. 3) has elapsed since the cleaning liquid began to flow in the order of flow path 41*h*, removal filter 54, and flow path 41*i*, the control device 96 stops driving pump 92 and bubble generator 93. At the same time, the control device 96 switches the valve 95*a* of the manifold 95 from the open state to the closed state, while switching the valve 95*b* of the manifold 95 from the closed state to the open state. The control device 96 then drives the compressor 94. As a result, the air from the compressor 94 flows through the manifold 95, the valves 66*c* and 66*b* of the switching valve 66, the flow path 41*h*, the removal filter 54, and the flow path 41*i* in that order.

Here, when air supply is initiated by the drive of the compressor 94, the cleaning liquid remains in the flow path 41*h*, the removal filter 54, and the flow path 41*i*. In this state, when the compressor 94 is driven, air from the compressor 94 pushes the cleaning liquid remaining in the flow path 41*h*, the removal filter 54, and the flow path 41*i* towards the valve 67*d* of the switching valve 67. As a result, the remaining cleaning liquid is discharged from the valve 67*d* of the switching valve 67 to the drain tank 97. Then, after the time T2 (see FIG. 3) has elapsed since the air flows to the flow path 41*h*, the control device 96 stops driving the compressor 94 and switches the valve 95*b* of the manifold 95 from the open state to the closed state. In addition, the control device 96 switches the valve 95*a* of the manifold 95 from the closed state to the open state, driving the pump 92 and the bubble generator 93 at the same time. As a result, the air supply is stopped, and the cleaning liquid is supplied again. It should be noted that the time T2 is set to be shorter than the time T1, for example, half the time T1. However, time T1 and time T2 are not limited to the above settings, for example, the time T1 and the time T2 may be set to be equal, or time T2 may be set to be longer than time T1.

Figure 3:
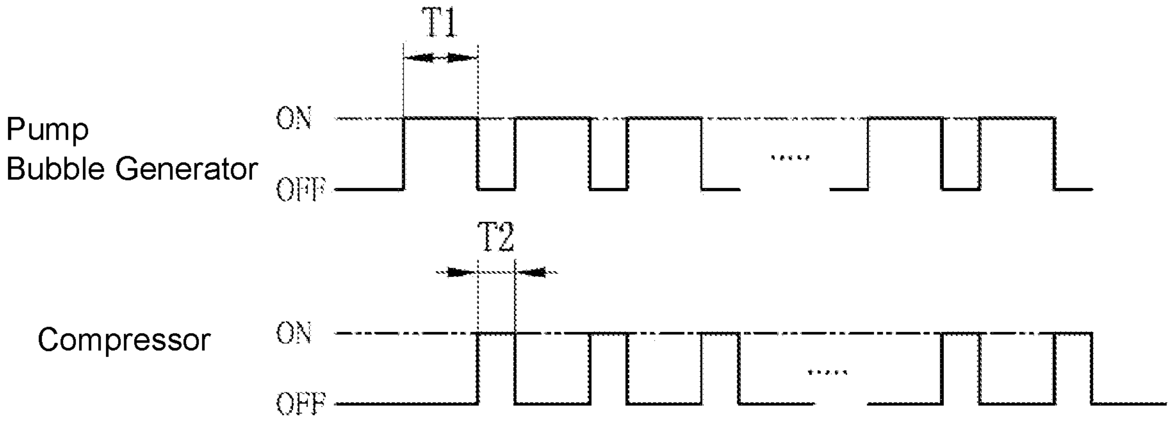
FIG. 3 is a timing chart showing an example of the drive control of the pump, bubble generator, and compressor when performing forward cleaning.

As shown in FIG. 3, the control device 96 supplies the cleaning liquid to the section above. That is, the control device 96 cleans the section while alternately switching between the operation of driving the pump 92 and the air bubble generator 93, and supplying air to the section, that is, the operation of driving the compressor 94. Then, when the operation of driving the pump 92 and the air bubble generator 93, and the operation of driving the compressor 94 are each performed for a predetermined number of times, the controller 96 stops cleaning the section.

Figure 4:
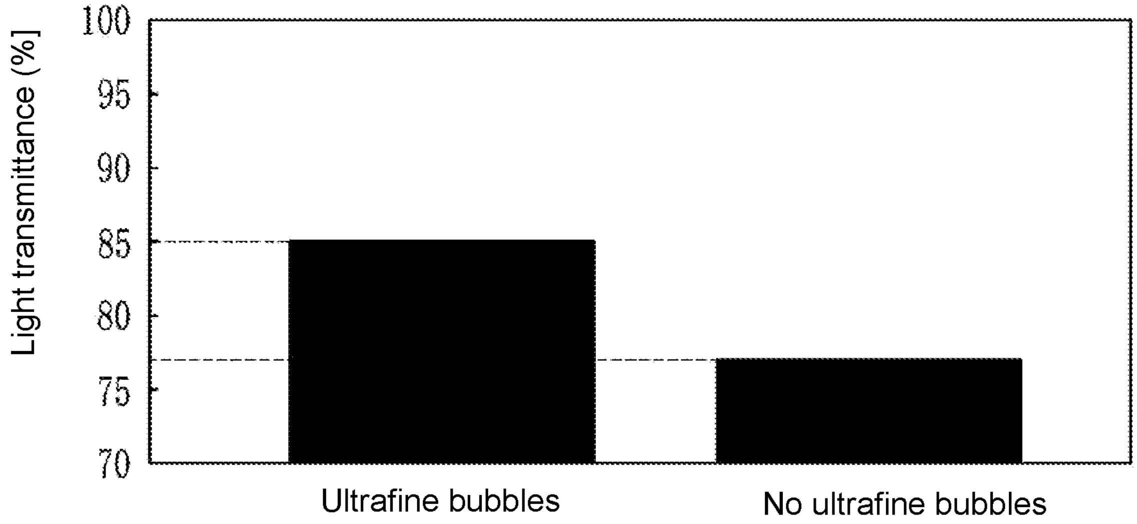
FIG. 4 is a graph showing the light transmittance of the cleaning liquid after performing the forward cleaning.

FIG. 4 is a graph illustrating an example of an experiment conducted with respect to the light transmittance of the liquid flowed after cleaning. In this experimental example, the light transmittance of the liquid flowing through the section after cleaning with a cleaning liquid containing ultrafine air bubbles was 85%. On the other hand, the light transmittance of the liquid flowing through the section after cleaning with a cleaning liquid containing no ultrafine air bubbles was 77%. It can be determined that the higher the light transmittance, the more dirt-free. Therefore, by performing cleaning using a cleaning liquid containing ultrafine air bubbles, dirt can be reliably removed.

Figure 5:
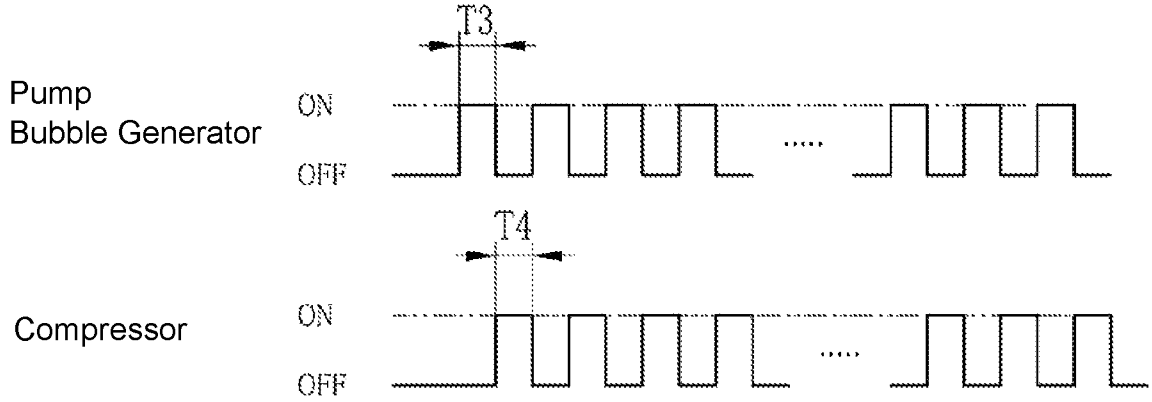
FIG. 5 is a timing chart showing an example of the drive control of the pump, bubble generator, and compressor when performing reverse cleaning.

The case where the section from the switching valve 66 to the switching valve 67 is cleaned by forward cleaning via the removal filter 54 has been described, but the above section can also be cleaned by reverse cleaning. In this case, the cleaning liquid or air is discharged from the valve 66*d* of the switching valve 66 after flowing into the section from the valve 67*c* of the switching valve 67. As shown in FIG. 5, when cleaning the section from the switching valve 66 to the switching valve 67 via the removal filter 54 by reverse cleaning, the cleaning of the section is performed while alternately switching between the operation of supplying the cleaning liquid to the section described above, that is, driving the pump 92 and the bubble generator 93, and the operation of supplying air to the section, that is driving the compressor 94, in the same manner as the forward cleaning. In this case, the time T3 for driving the pump 92 and the bubble generator 93 and the time T4 for driving the compressor 94 are set, for example, to the same time. It should be noted that the operation of driving the pump 92 and the bubble generator 93 and the operation of driving the compressor 94 may be performed the same number of times as the forward cleaning, or it may be different number of times. It should be noted that time T3 and time T4 are not limited to the above settings, for example, time T3 may be set to be longer than time T4, and time T4 may be set to be longer than time T3.

For the sake of explanation, the case where the section from the switching valve 66 to the switching valve 67 via the removal filter 54 is cleaned has been described. However, cleaning is performed in the same procedure for the section from the three-way valve 63 to the switching valve 64 via the gear pump 51, the section from the switching valve 64 to the switching valve 65 via the removal filter 52, the section from the switching valve 65 to the switching valve 66 via the degassing module 53, the section from the switching valve 67 to the switching valve 86 via the coating head 36, the section from the switching valve 86 to the switching valve 87, and the section from the switching valve 87 to the three-way valve 89 via the gear pump 82.

It should be noted that in the cleaning of the section from the three-way valve 63 to the switching valve 64 via the gear pump 51, the section from the switching valve 64 to the switching valve 65 via the removal filter 52, the section from the switching valve 65 to the switching valve 66 via the degassing module 53, the section from the switching valve 67 to the switching valve 86 via the coating head 36, the section from the switching valve 86 to the switching valve 87, and the section from the switching valve 87 to the three-way valve 89 via the gear pump 82, the time for flowing the cleaning liquid and the time for flowing air may be the same as or different from the time when cleaning the section from the switching valve 66 to the switching valve 67 via the removal filter 54. In addition, the number of times the cleaning liquid is flowed and the number of times the air is flowed may be the same as or different from the case when cleaning the section from the switching valve 66 to the switching valve 67 via the removal filter 54.

Second Embodiment

Figure 6:
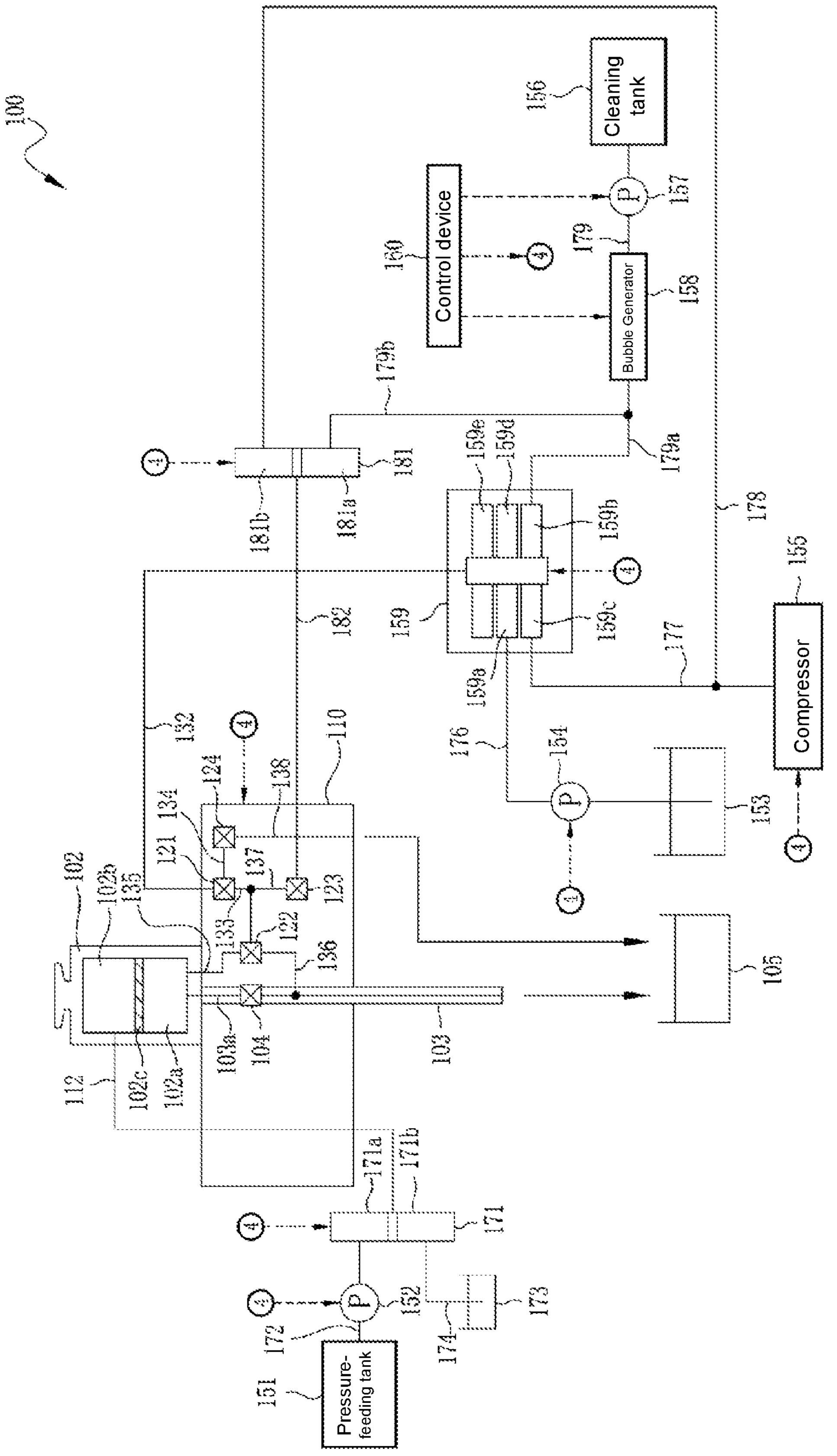
FIG. 6 is a diagram illustrating a configuration of a coating material supply device in a second embodiment.

Next, the second embodiment will then be described using FIG. 6. In the second embodiment, a coating material supply device 100 for filling coating material into a cartridge detachably held in a coating machine will be described as an example. In FIG. 6 as well, the flow paths provided in the coating material supply device 100 are indicated by solid lines, and electrical and pneumatic signals are indicated by dotted lines.

As shown in FIG. 6, the coating material supply device 100 comprises cartridges 102, a cartridge stacking unit 110 that holds the cartridges 102, a mechanism for supplying coating material to the cartridges 102, a mechanism for cleaning the coating material remaining in the coating material supply device 100 or the cartridge 102, and the like. The mechanism for supplying coating material to the cartridge 102 and the mechanism for cleaning coating material remaining in the coating material supply device 100 and cartridge 102 will be described below. In FIG. 6, one cartridge 102 is integrated into the cartridge stacking unit 110, but in reality, a plurality of cartridges 102 are integrated into the cartridge stacking unit 110. The cartridge stacking unit 110 corresponds to the holding section described in the claims.

The cartridge 102 is held in the cartridge stacking unit 110 to store coating materials supplied from the coating material tank 153. In addition, the coating material tank 153 corresponds to the reservoir described in the claims. Two spaces 102*a* and 102*b* are provided inside the cartridge 102, and these two spaces 102*a* and 102*b* are separated by a piston section 102*c*. Of the two spaces 102*a*, 102*b* provided in the interior of the cartridge 102, the space 102*a* located below the piston section 102*c* is filled with the coating material supplied from the coating material tank 153. In addition, the space 102*b* located above the piston section 102*c* is filled with a liquid for pumping (DCL: Delivery Control Liquid), when dispensing the coating material from the cartridge 102 or when cleaning the cartridge 102. The liquid for pumping is referred to below as DCL.

The piston section 102*c* provided in the interior of the cartridge 102 is movable, for example, in the up and down direction as shown in FIG. 6. For example, when a coating material is supplied to the cartridge 102, the coating material is stored in the space 102*a*. The coating material stored in the space 102*a* then presses the piston section 102*c* upward. This causes the piston section 102*c* to move upward. At this time, the DCL stored in the space 102*b* is pumped out of the space 102*b* to the exterior of the cartridge 102 and collected in a recovery tank (for example, recovery tank 173 in FIG. 6) provided outside the cartridge 102.

In addition, for example, when the DCL is supplied to the cartridge 102, the DCL is stored in the space 102*b*. The DCL stored in the space 102*b* then presses the piston section 102*c* downward. This causes the piston section 102*c* to move downward. At this time, a coating material stored in the space 102*a* is pumped from the space 102*a* to the feed tube 103 connected to the lower end of the cartridge 102.

Incidentally, when the piston section 102*c* provided in the cartridge 102 is positioned to the lowest end, the piston section 102*c* is held at a position where the lower surface of the piston section 102*c* is separated from the bottom surface of the internal space of the cartridge 102 by a predetermined distance. That is, when the piston section 102*c* is moved to the lowest end, the volume (capacity) of the space 102*a* is minimized, and the volume (capacity) of the space 102*b* is maximized. In addition, when the piston section 102*c* is located at the uppermost end, the piston section 102*c* is held at a position where the upper surface of the piston section 102*c* is separated from the upper surface of the internal space of the cartridge 102 by a predetermined distance. That is, when the piston section 102*c* moves to the uppermost end, the volume (capacity) of the space 102*a* is maximized, and the volume (capacity) of the space 102*b* is minimized.

The feed tube 103 is connected to the lower end of the cartridge 102. The feed tube 103 is a tubular-shaped member. The feed tube 103 communicates its internal space to the space 102*a* of the cartridge 102. When the cartridge 102 is mounted on a coating machine, not shown, the tip of the feed tube 103 is connected to a coating head (not shown) provided on the coating machine. Thus, when the coating material filled into the space 102*a* of the cartridge 102 is pumped out of the cartridge 102, the coating material is pumped out via the internal space of the feed tube 103 to the coating section provided in the coating machine. The internal space of the feed tube 103 may be referred to below as a delivery path 103*a*.

The feed tube 103 is provided with a control valve 104. The control valve 104 is normally held in a closed state. The control valve 104 is normally closed and controlled to open and close, when held in the cartridge stacking unit 110 or when the cartridge 102 is loaded into the coating machine.

The cartridge stacking unit 110 can hold one or more cartridges 102. The cartridge stacking unit 110 is provided with a plurality of control valves 121, 122, 123, 124.

The control valve (paint gate valve) 121 is, for example, a three-way valve, and the flow path switching control is performed by the control device 160. The switching of the flow path means switching the flow path connecting to the flow path 132 from the manifold 159 to either the flow path 133 between the control valves 121 and 122 or the flow path 134 between the control valves 121 and 124. Here, flow path 132 corresponds to a coating material supply channel described in the claims. The control valve 121 is normally held in such a state that the flow path connecting to the flow path 132 from the manifold 159 is the flow path 134 between the control valves 121 and 124. Then, during the supply of coating material to the cartridge 102, and during the cleaning of the coating material supply device 100 and the cartridge 102, the control valve 121 switches the flow path connecting the flow path 132 from the manifold 159 between the flow path 134 between the control valve 121 and the control valve 124, and the flow path 133 between the control valve 121 and the control valve 122.

The control valve (port valve) 122 is, for example, a three-way valve, and the flow path switching control is performed by the control device 160. Switching the flow path means switching the flow path to which the flow path 133 between the control valve 121 and the control valve 122 is connected to either the flow path 135 between the control valve 122 and the cartridge 102, or the flow path 136. The control valve 122 is normally held in such a state that the flow path connecting the flow path 133 between the control valve 121 and the control valve 122 is the flow path 135 between the control valve 122 and the cartridge 102. Then, during cleaning the coating material supply device 100 and the cartridge 102, the control valve 122 switches the flow path connecting the flow path 133 between the control valve 121 and the control valve 122 between the flow path 135 between the control valve 122 and the cartridge 102, and the flow path 136.

The control valve (wash gate valve) 123 is controlled to open and close by the control device 160. The control valve 123 is normally held in a closed state and switched to an open state at the time of cleaning. When control valve 123 is in the open state, flow path 182 and flow path 137 from three-way valve 181 are connected. The flow path 137 connected to the output side of the control valve 123 merges with the flow path 133 connected to the output side of the control valve 121.

The control valve (dump valve) 124 is controlled to open and close by the control device 160. The control valve 124 is normally held in a closed state and is switched to an open state at the time of cleaning the manifold 159. When the control valve 124 is in the open state, the flow path 134 and the flow path 138 are connected. The flow path 138 functions as a discharge flow path for discharging the cleaning liquid to the drain tank 105, for example.

In addition to the control valves provided in the cartridge 102 and the cartridge stacking unit 110, the coating material supply device 100 includes a pressure-feeding tank 151, a pump 152, a coating material tank 153, a pump 154, a compressor 155, a cleaning tank 156, a pump 157, an air bubble generator 158, a manifold 159, a control device 160, and the like. It should be noted that the control device 160 corresponds to the coating material supply control unit, cleaning control unit, and switching control unit described in the claims.

The pressure-feeding tank 151 stores the DCL supplied to the cartridge 102. The pump 152 is driven and controlled by the control device 160. For example, the pump 152 drives at the time of cleaning the cartridge 102 to pump DCL stored in the pressure-feeding tank 151 towards the cartridge 102.

A three-way valve 171 is provided between the pressure-feeding tank 151 and the cartridge 102. The three-way valve 171 has two valves 171*a*, 171*b*. These valves 171*a*, 171*b* are controlled to open and close by the control device 160. For example, when the pump 152 is driven, the three-way valve 171 is controlled to open the valve 171*a* and close the valve 171*b*. This connects the flow path 172 from the pressure-feeding tank 151 and the flow path 112 connected to the space 102*b* of the cartridge 102. Thus, DCL stored in the pressure-feeding tank 151 is supplied to the space 102*b* of the cartridge 102.

In addition, for example, when supplying a coating material to the cartridge 102, the three-way valve 171 is controlled to close the valve 171*a* and open the valve 171*b*. This connects the flow path 174 to the recovery tank 173 and the flow path 112 connected to the space 102*b* of the cartridge 102. As described above, when the coating material is supplied to the space 102*a* of the cartridge 102, the piston section 102*c* is pressed upward by the supplied coating material. Thus, the DCL that was stored in space 102*b* is pumped into flow path 112 and recovered through flow paths 112, 174 to recovery tank 173.

The coating material tank 153 stores coating material. The pump 154 is, for example, a diaphragm pump and is driven and controlled by the control device 160. The pump 154 is driven when a coating material is supplied to the cartridge 102 and sends the coating material stored in the coating material tank 153 to the manifold 159 via the flow path 176. It should be noted that the pump 154 corresponds to the dispensing section described in the claims.

The compressor 155 is driven and controlled by the control device 160. The compressor 155 is driven when cleaning the coating material supply device 100 and the cartridge 102, and sends cleaning air (hereinafter referred to as air) to manifold 159 via flow path 177 and to three-way valve 181 via flow path 178 branched from flow path 177. The compressor 155 corresponds to the air supply unit described in the claims.

The cleaning tank 156 stores the cleaning liquid. The pump 157 is driven and controlled by the control device 160. The pump 157 is driven when cleaning the coating material supply device 100 and the cartridge 102, and sends out the cleaning liquid stored in cleaning tank 156 to manifold 159 and three-way valve 181 via flow path 179. It should be noted that the pump 157 corresponds to the cleaning liquid supply unit described in the claims.

A bubble generator 158 is disposed downstream of the pump 157 of the flow path 179. The bubble generator 158 is driven by the control device 160. The bubble generator 158 is driven with the drive of the pump 157 to generate ultrafine bubbles in the cleaning liquid pumped out by the pump 157. The flow path 179 branches downstream of the air bubble generator 158 into a flow path 179*a* connected to the manifold 159 and a flow path 179*b* connected to the three-way valve 181. It should be noted that as in the first embodiment, the bubble generator 158 may generate fine bubbles in the cleaning liquid, or may generate ultrafine bubbles and fine bubbles.

The three-way valve 181 has two valves 181*a*, 181*b*. These valves 181*a*, 181*b* are controlled to open and close by a control device 160. The three-way valve 181 is controlled to open and close when the manifold 159 and the cartridge 102 are cleaned. For example, the three-way valve 181 opens valve 181*a* and closes valve 181*b* to connect flow path 179*b* and flow path 182 connected to control valve 123. The three-way valve 181 closes the valve 181*a* and opens the valve 181*b* to connect the flow path 178 and the flow path 182 connected to the control valve 123.

Manifold 159 has a plurality of valve portions 159*a*, 159*b*, 159*c*, 159*d*, 159*e*, and these valve portions 159*a*, 159*b*, 159*c*, 159*d*, and 159*e* are individually controlled to open and close by control device 160. Of the plurality of valve portions 159*a*, 159*b*, 159*c*, 159*d*, 159*e*, valve portion 159*a* is connected to flow path 176 from coating material tank 153. The valve portion 159*b* is connected to a flow path 179*a* from the cleaning tank 156. The valve portion 159*c* is connected to a flow path 177 from the compressor 155. Further, when the valve portion 159*d* is opened, the valve portion 159*d* connects the flow path connected to the valve that is in the open state among the valve portions 159*a*, 159*b*, and 159*c*, and the flow path 132. The valve portion 159*e* is a dump valve. The manifold 159 corresponds to the switching section described in the claims.

Figure 7:
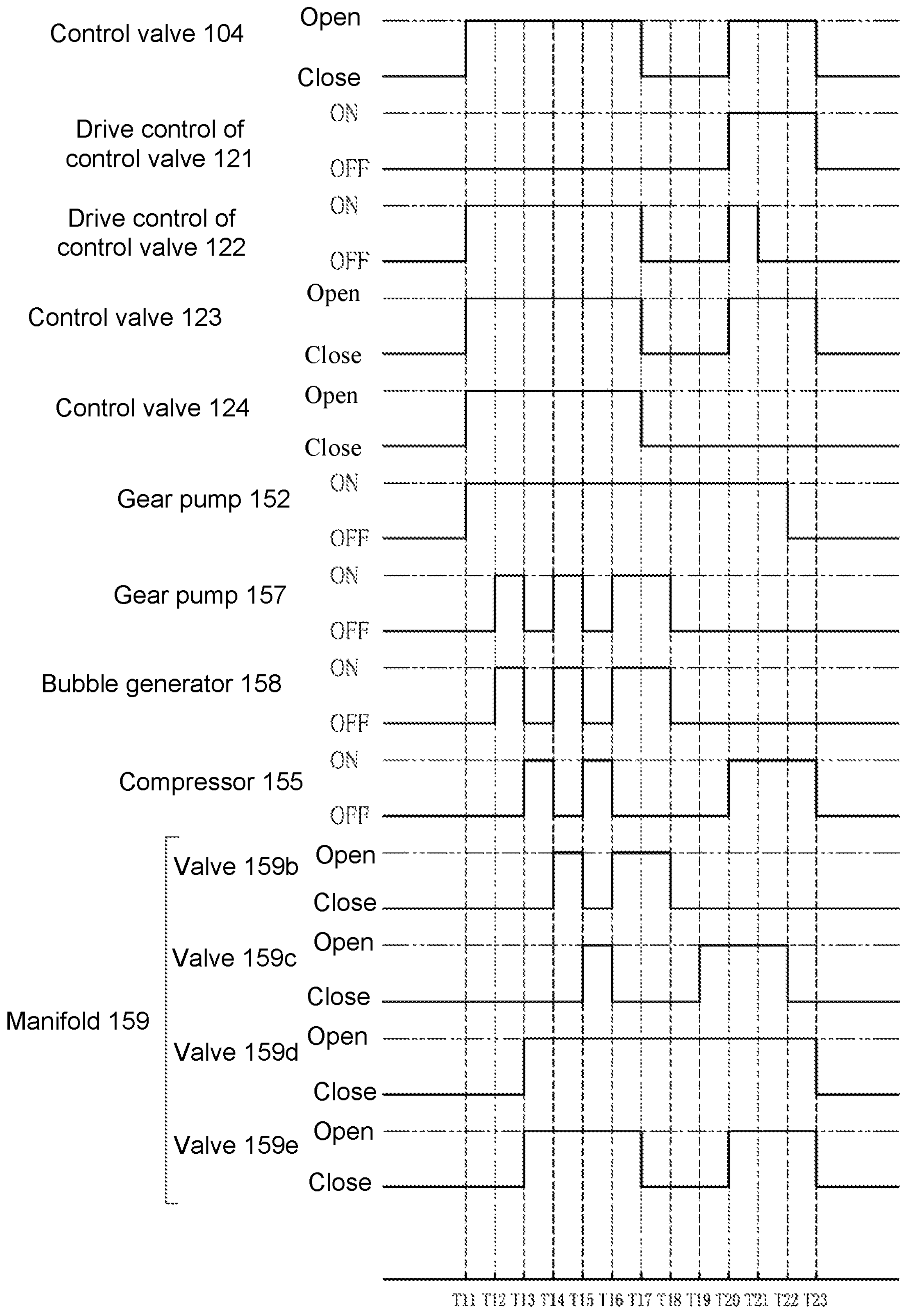
FIG. 7 is an example of a timing chart for each part of the coating material supply device in a second embodiment.

The flow of processing when cleaning the coating material supply device 100 and cartridge 102 described above will be described with reference to the timing chart of FIG. 7. The timing chart in FIG. 7 only describes the operation of the main configuration of the coating material supply device 100. In addition, the timing chart of FIG. 7 shows the width of the scale indicating the passage of time at equal intervals for convenience, but includes the time interval for the width of the scale that is not necessarily the same.

First, at time T11, the control device 160 opens the control valves 104, 123, and 124, respectively. In addition, the control device 160 performs switching control of the control valve 122 and switches the flow path connected to the flow path 133 to the flow path 135. In the timing chart in FIG. 7, only switching control of control valves 121 and 122 is on and off, and details of switching control will be omitted.

The control device 160 controls the opening and closing of the three-way valve 171, leaving the valve 171*a* of the three-way valve 171 open and the valve 171*b* closed. The control device 160 drives the pump 152. When the pump 152 is driven, the DCL stored in the pressure-feeding tank 151 is drawn out from the pressure-feeding tank 151 and sent toward the cartridge 102. The DCL passes through the flow path 112 via the valve 171*a* of the three-way valve 171 and is stored in the space 102*b* of the cartridge 102. As the DCL is pumped towards the space 102*b* of the cartridge 102 while the pump 152 is driven, the amount of DCL stored in the space 102*b* of the cartridge 102 increases. As a result, the piston section 102*c* moves to the lowest end, and the coating material stored (residual) in the space 102*a* of the cartridge 102 is sent to the delivery path 103*a* of the feed tube 103. The coating material sent to the delivery path 103*a* of the feed tube 103 is discharged to the drain tank 105.

At time T12, the control device 160 performs the opening and closing control of the three-way valve 181, sets the valve 181*a* of the three-way valve 181 open and the valve 181*b* closed. The control device 160 drives the pump 157 and the bubble generator 158.

By driving the pump 157, the cleaning liquid stored in the cleaning tank 156 flows through the flow path 179, the flow path 179*b*, and the flow path 182 in this order. At this time, the bubble generator 158 generates ultrafine bubbles in the cleaning liquid flowing through the flow path 179. The cleaning liquid, including ultrafine bubbles, flows in the order of flow path 182, flow path 137, and flow path 133, then flows through flow path 135 and into space 102*a* of cartridge 102. As a result, the coating material remaining in the space 102*a* of the cartridge 102 is sent to the delivery path 103*a* of the feed tube 103 by the cleaning liquid. The space 102*a* of the cartridge 102 is then stored with the cleaning liquid. Because the cleaning liquid contains ultrafine air bubbles, while the cleaning liquid flows through each flow path and is stored in the space 102*a* of the cartridge 102, it adsorbs dirt and coating material remaining in each channel and the space 102*a* of the cartridge 102. Because the cleaning liquid is flowing for a predetermined period of time, the cleaning liquid stored in the space 102*a* of the cartridge 102 flows through the delivery path 103*a* of the feed tube 103 and drains into the drain tank 105.

At time T13, the control device 160 operates the three-way valve 181 to close the valve 181*a* and open the valve 181*b*. In addition, the control device 160 stops driving the pump 157 and the bubble generator 158. The control device 160 then drives the compressor 155. At this time, the control device 160 activates the manifold 159 to open the valve portions 159*d* and 159*e* of the manifold 159.

When the compressor 155 is driven, air from the compressor 155 flows in the order of the flow path 178, the flow path 182, the flow path 137, the flow path 133, and the flow path 135, and then into the space 102*a* of the cartridge 102. At this time, the flow path 182, flow path 137, flow path 133, and flow path 135, and the space 102*a* of cartridge 102 have residual cleaning liquid, so that air sent from the compressor 155 discharges the cleaning liquid remaining in these flow paths and the space 102*a* of the cartridge 102 to the drainage tank 105 via the delivery path 103*a* of the feed tube 103.

At time T14, the control device 160 stops driving the compressor 155. The control device 160 activates the three-way valve 181 to open the valve 181*a* and close the valve 181*b*. The control device 160 activates the manifold 159 to leave the valve portion 159*b* of the manifold 159 open. In addition, the control device 160 drives the pump 157 and the bubble generator 158.

In response, a portion of the cleaning liquid pumped by the pump 157 flows from the flow path 179*b* in the order of the flow path 182, the flow path 137, the flow path 133, and the flow path 135, and then flows into the space 102*a* of the cartridge 102. Because the cleaning liquid flows for a predetermined amount of time, the cleaning liquid that has reached the space 102*a* of the cartridge 102 flows from the space 102*a* of the cartridge 102 through the delivery path 103*a* of the feed tube 103 to the drain tank 105. In addition, a portion of the cleaning liquid pumped by the pump 157 flows from the flow path 179*a* to the interior of the manifold 159 via the valve portion 159*b*, then flows through the flow path 132, flow path 134, and flow path 138, and then drains into the drain tank 105. At this time, the interior of the manifold 159 is cleaned by the cleaning liquid that has flowed into the interior of the manifold 159.

At time T15, the control device 160 stops driving the pump 157 and the bubble generator 158. In addition, the control device 160 activates the three-way valve 181 to close the valve 181*a* of the three-way valve 181 and to open the valve 181*b*. Further, the control device 160 closes the valve portion 159*b* of the manifold 159 and opens the valve portion 159*c*. Finally, the control device 160 drives the compressor 155.

In response, air fed from the compressor 155 flows in the order of the flow path 178, the flow path 182, the flow path 137, the flow path 133, and the flow path 135, and then flows into the space 102*a* of the cartridge 102. Air flowing into the space 102*a* of the cartridge 102 is discharged via the delivery path 103*a* of the feed tube 103. At this time, the flow path 182, flow path 137, flow path 133, and flow path 135, and the space 102*a* of cartridge 102 have residual cleaning liquid, so the air sent from the compressor 155 discharges the cleaning liquid remaining in these flow paths into the drain tank 105.

The air that is fed from the compressor 155 flows from the flow path 177 to the manifold 159. The air flowing into the manifold 159 flows in the order of flow path 132, flow path 134, and flow path 138. At this time, the cleaning liquid remains in the interior of the manifold 159, the flow path 132, the flow path 134, and the flow path 138, so that the remaining cleaning liquid is discharged to the drainage tank 105 via the flow path 138 by the air flowing through the flow path.

At time T16, the control device 160 activates three-way valve 181 to open valve 181*a* of three-way valve 181 and close valve 181*b*. In addition, the control device 160 stops driving the compressor 155. Further, the control device 160 opens the valve portion 159*b* of the manifold 159 and closes the valve portion 159*c*. In addition, the control device 160 drives the pump 157 and the bubble generator 158.

In response, a portion of the cleaning liquid pumped by the pump 157 flows from the flow path 179*b* in the order of the flow path 182, the flow path 137, the flow path 133, and the flow path 135, and then flows into the space 102*a* of the cartridge 102. This causes the cleaning liquid to accumulate in the space 102*a* of the cartridge 102, and a portion of the stored cleaning liquid flows from the cartridge 102 through the delivery path 103*a* of the feed tube 103 and into the drain tank 105. In addition, a portion of the cleaning liquid stored in the cleaning tank 156 flows from the flow path 179*a* to the interior of the manifold 159 via the valve portion 159*b*, followed by the flow path 132, the flow path 134, and the flow path 138, and drains into the drain tank 105.

At time T17, the control device 160 activates three-way valve 181 to close valve 181*a*. At the same time, the control device 160 closes the control valves 104, 123, 124. In addition, the control device 160 closes the valve portion 159*e* of the manifold 159. This causes the cleaning liquid pumped by the pump 157 to flow only to the flow path 179*a*, from the flow path 179*a* to the interior of the manifold 159 via the valve portion 159*b*, and then to flow in the order of the flow path 132, flow path 134, and flow path 138 to drain to the drain tank 105. At this time, from the flow path 179*b*, in addition to the flow path 182, flow path 137, flow path 133, and flow path 135, cleaning liquid remains in the space 102*a* of the cartridge 102. Thus, if the coating material (pigment) remains in the space 102*a* of these flow paths or cartridges 102, the remaining coating material is dissolved in the cleaning liquid.

At time T18, the control device 160 closes valve portion 159*b* of manifold 159. In addition, the control device 160 stops driving the pump 157 and the bubble generator 158. This stops the supply of cleaning liquid. At this time, cleaning liquid remains in the interior of the manifold 159 and in the flow paths 132, 134. Thus, if coating material (pigment) remains in the interior of manifold 159 or in flow paths 132, 134, the remaining coating material is dissolved in the cleaning liquid.

At time T19, the control device 160 opens the valve portion 159*c* of the manifold 159. At time T20, the control device 160 activates the three-way valve 181 to open valve 181*b* of the three-way valve 181. The control device 160 opens the control valves 104 and 123. The control device 160 controls the control valve 121 to switch the flow path connected to the flow path 132 to the flow path 133. In addition, the control device 160 controls the control valve 122 to switch to a state in which the flow path 133 is in communication with the flow path 136. At the same time, the control device 160 drives the compressor 155. As a result, the remaining cleaning liquid is discharged from the delivery path 103*a* of the feed tube 103 to the drain tank 105 via the flow path 136 by the air flowing through the flow path 132 via the manifold 159.

At time T21, the control device 160 stops control of control valve 122 and switches to a state in which the flow path 133 is in communication with the flow path 135. As a result, the cleaning liquid remaining in the cartridge 102 is discharged from the delivery path 103*a* of the feed tube 103 to the drain tank 105 by the air delivered from the compressor 155.

At time T22, the control device 160 drives three-way valve 181 to close valve 181*b* of three-way valve 181. In addition, the control device 160 closes the valve portion 159*c* of the manifold 159. In addition, the control device 160 stops driving the compressor 155. Furthermore, the control device 160 closes the valve 171*a* of the three-way valve 171 and stops driving the pump 152. This stops the supply of DCL to the space 102*b* of the cartridge 102.

At time T23, the control device 160 closes control valves 104, 123. In addition, the control device 160 stops the switching control of the control valves 121, 122. This results in a state in which the flow path 132 and flow path 133 are connected, and a state in which the flow path 133 and flow path 135 are connected. Finally, the valve portion 159*e* of manifold 159 is closed. As a result, cleaning of each part of the coating material supply device 100 such as the cartridge 102 and the manifold 159 is completed.

Although details are omitted from the illustration, when supplying coating material to the cartridge 102, the control device 160 opens the valve portions 159*a* and 159*d* of the manifold 159 to drive the pump 154. At the same time, the control device 160 opens the valve 171*b* of the three-way valve 171. As a result, the coating material sent to the pump 154 flows through the flow paths 132, 133, and 135 in this order and is stored in the space 102*a* of the cartridge 102. As the coating material is stored in the space 102*a* of the cartridge 102, the piston section 102*c* of the cartridge 102 is moved upward by the coating material to pump the DCL stored in the space 102*b* of the cartridge 102 into the flow path 112 connected to the space 102*b* of the cartridge 102. The DCLs fed into the flow path 112 are recovered via the flow path 174 to the recovery tank 173.

Figure 8:
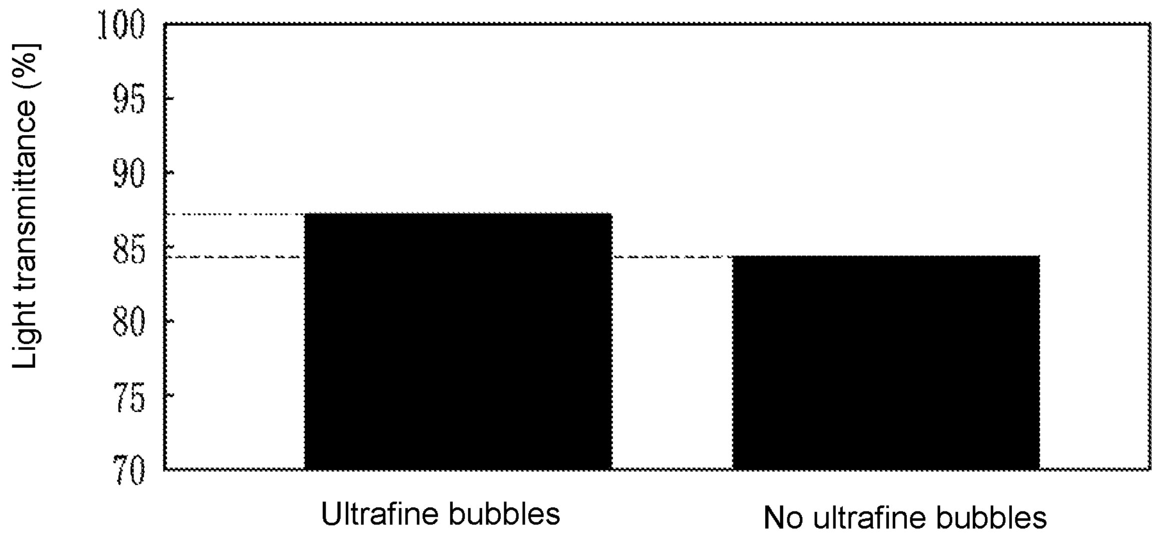
FIG. 8(*a*) and FIG. 8(*b*) are graphs showing the light transmittance in the cleaning liquid after cleaning.
Figure 8:
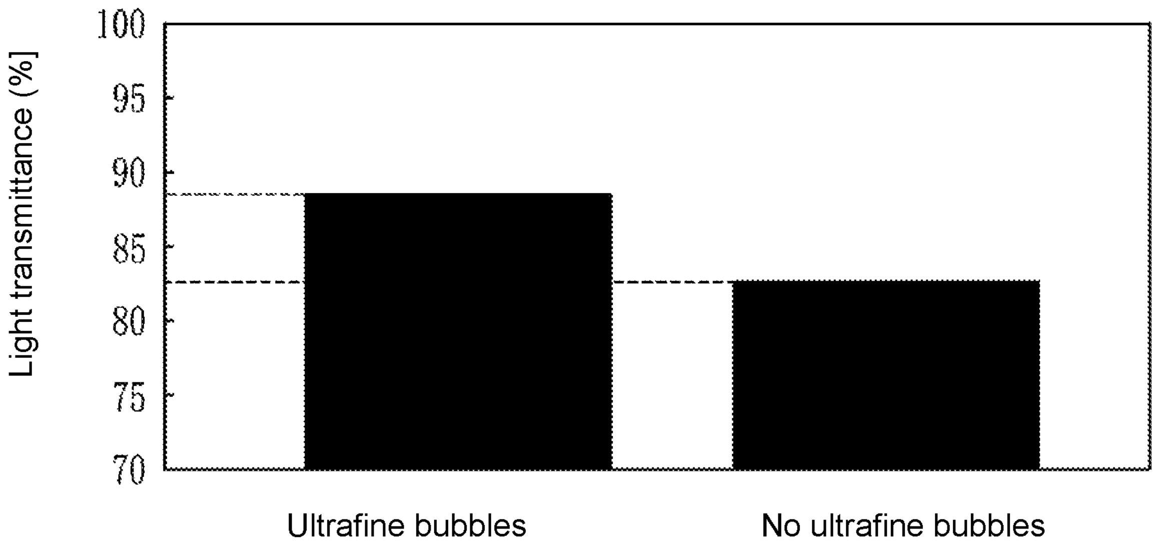

FIG. 8(*a*) and FIG. 8(*b*) are graphs showing the light transmittance of the liquid flowed after cleaning, respectively. In FIG. 8(*a*), the light transmittance after cleaning was 87.2% in the first verification (referred to as Verification 1 in FIG. 8(*a*)). In addition, the light transmittance was 84.3% in cleaning with a cleaning liquid that does not contain ultrafine air bubbles. Further, as shown in FIG. 8B, in the second verification (referred to as Verification 2 in FIG. 8B), the light transmittance after cleaning was 88.5%. On the other hand, the light transmittance was 82.6% in the cleaning using the cleaning liquid containing no ultrafine air bubbles. Also in this case, it can be seen that dirt can be reliably removed by performing cleaning using a cleaning liquid containing ultrafine air bubbles.

The second embodiment exemplifies the coating material supply device 100 in which one coating material tank 153 in which coating material is stored is connected to the manifold 159. However, a coating material supply device may be used in which a plurality of coating material tanks 153 in which coating materials of a plurality of colors are individually stored are connected to a manifold 159.

In the second embodiment, the air from the compressor 155 can be supplied to the manifold 159 and the three-way valve 181 via the flow path 177 and the flow path 178 branched from the flow path 177. However, it is also possible to provide a compressor in each of the flow paths connected to manifold 159 and three-way valve 181. Similarly, by driving the pump 157, the cleaning liquid can be supplied to the manifold 159 and the three-way valve 181 via the flow path 179*a* and the flow path 179*b* branching from the flow path 179*a*. However, it is also possible to provide pumps and bubble generators in each of the flow paths connected to manifold 159 and three-way valve 181.

SUMMARY OF EFFECTS

According to the coating material supply device according to the present invention, in the coating material supply devices 30, 100 having a supply path 41 and a flow path 132 for supplying coating material, and at least the supply path 41 and the flow path 132 are cleaned by sending a cleaning liquid and a cleaning air into the supply path 41 and the flow path 132, the device has pumps 92 and 157 for supplying the cleaning liquid to the supply path 41 and the flow path 132; a bubble generator 93, 158 for generating fine bubbles containing at least one of microbubbles and nanobubbles in the cleaning liquid supplied to the supply path 41 and the flow path 132 by the pumps 92, 157; compressors 94 and 155 for supplying cleaning air to the supply path 41 and the flow path 132; and a control device 96, 160 for controlling the driving of the pumps 92, 157 and the driving of the compressors 94, 155, where the control device 96, 160 control to alternately drive the pumps 92, 157 and the compressors 94, 155 to alternately send a cleaning liquid containing fine bubbles and a cleaning air to the supply path 41 and the flow path 132.

Conventionally, alternately pumping the cleaning liquid and the cleaning gas [sic] into the coating material supply channel causes the cleaning liquid to bubble when alternately pumping the cleaning liquid and the cleaning gas [sic], which removes any coating material remaining in the coating material supply channel and discharge section. Since the bubbles generated by the frothing of the cleaning liquid are larger than the pigments contained in the coating material, even if the supply path 41 and flow path 132 are cleaned, coating materials (pigments) that sticks to the inner wall of the supply path 41 and flow path 132 remain. This can cause discoloration, because of the mixture of the residual coating material (pigment) with the coating material to be used next, for example, when changing the color of the coating material to be used.

In the present invention, cleaning is performed using a cleaning liquid that contains fine bubbles smaller than the pigments contained in the coating material, so in addition to cleaning dirt by foaming the cleaning liquid, fine bubbles contained in the cleaning liquid can remove coating material (pigments) that sticks to the inner wall surface of the supply path 41 and flow path 132. This improves the cleaning performance for the inner walls of the supply path 41 and the flow path 132, and suppresses the discoloration of the coating material due to the mixing of the coating material remaining on the internal wall surface of the supply path 41 and the flow path 132 with the coating material to be used next. Improving cleaning performance can contribute to shortening the cleaning time and reducing the amount of cleaning liquid used.

In addition, the device has a coating material tank 35 in which coating material is stored, and a return channel 42 for returning unused coating material from the coating head 36 to the coating material tank 35 among the coating materials supplied via the supply path 41 toward the coating head 36 that performs coating of the vehicle body B; where the supply path 41 and the return flow path 42 together with the coating head 36 constitute a coating material circulation channel A for circulating the coating material between the coating material tank 35 and the coating head 36, the coating material circulation channel A is cleaned, by the control device 96 that controls the driving of the pump 92 and the compressor 94, so that the cleaning liquid and the cleaning air are sent in the same direction as or in the opposite direction to the coating material circulation direction.

According to this, cleaning can be performed by switching the direction of the cleaning liquid and the air according to the type of coating material, thereby improving the cleaning performance for the supply path 41 and the coating head 36. Improving cleaning performance can contribute to shortening the cleaning time and reducing the amount of cleaning liquid used.

Coating material circulation channel A includes a plurality of circuit components and switching valves 64, 65, 66, 67, 86, 87 disposed between each of at least two adjacent circuit components of the plurality of circuit components, wherein control device 96 controls any two switching valves so as to pump a cleaning liquid containing fine bubbles and cleaning air into the flow path between any two switching valves and the circuit components disposed in the flow path of the two switching valves each provided between at least two adjacent circuit components.

According to this, cleaning can be performed for the section, in which the circuit components are disposed, based on the structure of the circuit component disposed in the coating material circulation channel A. Therefore, cleaning for coating material circulation channel A can be performed efficiently.

The coating machine 10 of the present invention comprises a coating material supply device 30 as described above, a nozzle forming surface 36*a* arranged with a plurality of nozzles 37 in a predetermined arrangement pattern, and a coating head 36 for coating the vehicle body B by discharging the coating material supplied by the coating material supply device 30 from each of a plurality of nozzles 37.

According to this, cleaning is performed using a cleaning liquid containing fine bubbles that are smaller than the pigment contained in the coating material, so these fine bubbles contained in the cleaning liquid peel off and remove coating material (pigment) sticking to the inner wall surface of the supply path 41 and the inside of the coating head 36. This improves the cleaning performance for the supply path 41 and the coating head 36, and suppresses the discoloration of the coating material due to mixing of the coating material remaining on the inner wall surface of the supply path 41 and the inside of the coating head 36 with the coating material to be used next. Improving cleaning performance can contribute to shortening the cleaning time and reducing the amount of cleaning liquid used.

Since the fine bubbles contained in the cleaning liquid are smaller than the inner diameter of the nozzle 37, the fine bubbles contained in the cleaning liquid remaining in the interior of the nozzle 37 after cleaning are discharged from the plurality of nozzles 37 provided in the coating head 36 and do not remain in the interior of the nozzle 37. As a result, after cleaning, when coating material is ejected from the plurality of nozzles 37 provided in the coating head 36, the generation of uneven coating material due to residual air bubbles in the interior of the nozzle 37 is suppressed.

Furthermore, the device has a cartridge stacking unit 110 that detachably holds the cartridges 102 filled with coating material, a coating material tank 153 for storing coating material, a pump 157 for sending the coating material stored in the coating material tank 153 from the coating material tank 153 to the cartridge 102 via the flow path 132, and a control device 160 for controlling the supply of coating material from the coating material tank 153 to the cartridge 102; where in response to the fact that the cartridge stacking unit 110 holds the cartridge 102, the control device 160 cleans the inside of the cartridge 102 held in the flow path 132 and the cartridge stacking unit 110, and the control device 160 drives the pump 154, in response to the cartridge 102 being held by the cartridge stacking unit 110, to fill the cartridge 102 with the coating material stored in the coating material tank 153.

According to this, not only the flow path 132 but also the cartridge 102 can be efficiently cleaned at a predetermined timing, such as when the cartridge 102, which is detachably attachable to the coating machine, is filled with the coating material. As a result, depending on the type of coating material, it is possible to fill one cartridge 102 with different coating materials, eliminating the need for a cartridge to be provided per coating material.

The control device 160 is controlled to alternately drive the pump 157 and the compressor 155 when it is time for the cartridge 102 held by the cartridge stacking unit 110 to be cleaned, and the interior of the flow path 132 and the cartridge 102 is cleaned by sending the cleaning liquid containing fine bubbles and the cleaning air into the flow path 132 and the cartridge 102.

According to this, not only the flow path 132 but also the cartridge 102 can be efficiently cleaned at a predetermined timing, such as when the cartridge 102, which is detachably attachable to the coating machine, is filled with the coating material.

Furthermore, the device has a manifold 159 for switching the coating material to be supplied to the flow path 132, by connecting a plurality of coating material tanks 153 provided corresponding to each of a plurality of types of coating material, and by connecting one of the connected coating material tanks 153 to the flow path 132, and a control device 160 that controls the manifold 159; where the manifold 159 is connected to a plurality of coating material tanks 153 as well as pump 157 and compressor 155, and the control device 160 controls the manifold 159, so as to sequentially switch between the connection between the flow path 132 and the pump 157 and the connection between the flow path 132 and the compressor 155 when the flow path 132 is cleaned.

According to this, when cleaning the cartridge 102, the flow path for supplying the coating material to the cartridge 102 and the inside of the manifold 159 can be cleaned. Therefore, the cleaning performance of the cartridge 102 and the coating material supply device 100 that supplies coating material to the cartridge 102 can be improved.

In addition, the cartridge 102 is detachably attached to the coating machine performing the coating of the vehicle body B, and the cartridge 102 has a delivery path 103*a* that, when mounted to the coating machine, sends the coating material filled inside towards the coating head the coating machine has.

According to this, the cleaning liquid used to clean the interior of the cartridge 102 can be discharged via the delivery path 103*a*. As a result, not only the inside of the cartridge 102 but also the coating delivery path 103*a* can be cleaned at the same time.

EXPLANATION OF REFERENCES

10 . . . Coating machine
30, 100—Coating material supply devices
35, 153 . . . Coating material tanks
36, 101 . . . Coating heads
41 . . . Supply path
42 . . . Return flow path
92, 154, 157 . . . Pumps
93, 158 . . . Bubble generators
94, 155 . . . Compressors
96, 160 . . . Control devices
102 . . . Cartridge
103 . . . Feed tube
103*a* . . . Delivery path

132 . . . Flow path
159 . . . Manifold
A . . . Coating material circulation channel

The invention claimed is:

1. A coating material supply device capable of cleaning at least a coating material supply channel by pumping a cleaning liquid and cleaning air into the coating material supply channel, the coating material supply device comprising:

the coating material supply channel, wherein the coating material supply channel is configured to receive a coating material supplied through the coating material supply device;

a manifold comprising a first valve, a second valve, and a third valve;

a cleaning tank for storing the cleaning liquid;

a cleaning liquid supply unit for supplying the cleaning liquid from the cleaning tank to the coating material supply channel through the first valve and the third valve along a first flow path;

a bubble generator for generating fine bubbles comprising at least one of microbubbles and nanobubbles in the cleaning liquid, wherein the bubble generator is along the first flow path between the cleaning tank and the first valve;

an air supply unit for supplying the cleaning air to the coating material supply channel through the second valve and the third valve along a second flow path; and a cleaning control unit for controlling driving of the cleaning liquid supply unit and driving of the air supply unit, wherein during cleaning, the cleaning control unit controls to alternately drive the cleaning liquid supply unit while opening the first valve and closing the second valve and the air supply unit while opening the second valve and closing the first valve to alternately supply the cleaning liquid containing the fine bubbles and the cleaning air to the coating material supply channel.

2. The coating material supply device according to claim 1, further comprising:

a reservoir in which the coating material is stored; and a return flow path for returning the coating material not used at a coating section back to the reservoir via the coating material supply channel, wherein the coating material supply channel and the return flow path, together with the coating section, constitute a coating material circulation channel to circulate the coating material between the reservoir and the coating section in a coating material circulation direction, and the cleaning control unit cleans the coating material circulation channel by controlling the drive of the cleaning liquid supply unit and the drive of the air supply unit, so that the cleaning liquid and the cleaning air are sent in the same direction as the coating material circulation direction or in the opposite direction to the coating material circulation direction.

3. The coating material supply device according to claim 2, further comprising:

a plurality of sorting means for partitioning the coating material circulation channel, wherein the coating material circulation channel is arranged with a plurality of circuit components, and the cleaning control unit controls any two of the plurality of sorting means so that the cleaning liquid containing the fine bubbles and the cleaning air are fed into a flow path between the any two sorting means and any circuit components of the plurality of circuit components arranged in the flow path.

4. The coating material supply device according to claim 1, further comprising:

a holding section that detachably holds a cartridge filled with the coating material;

a coating material tank that stores the coating material;

a dispensing section for pumping the coating material stored in the coating material tank from the coating material tank to the cartridge via the coating material supply channel; and a coating material supply control unit for controlling the supply of coating material from the coating material tank to the cartridge, wherein the cleaning control unit, in response to the holding section holding the cartridge, cleans the inside of the coating material supply channel and the cartridge held by the holding section, the coating material supply control unit, in response to the holding section holding the cartridge, drives the dispensing section to fill the cartridge with the coating material stored in the coating material tank.

5. The coating material supply device according to claim 4, wherein for cleaning the cartridge held by the holding section, the cleaning control unit controls to alternately drive the cleaning liquid supply unit and the air supply unit, and cleans the inside of the coating material supply channel and the cartridge, by feeding the cleaning liquid containing the fine bubbles and the cleaning air into the coating material supply channel and the cartridge.

6. The coating material supply device according to claim 4, further comprising:

a switching section that is connected to a plurality of coating material tanks, wherein the switching section is configured to switch the coating material supplied to the coating material supply channel by connecting any one of the plurality of coating material tanks to the coating material supply channel; and a switching control unit that controls the switching section, wherein the switching section is connected to the cleaning liquid supply unit and the air supply unit, in addition to the plurality of coating material tanks.

7. The coating material supply device according to claim 4, characterized in that the cartridge is detachably mounted to a coating machine performing the coating of an object to be coated; and the cartridge has a delivery path that, when mounted to the coating machine, pumps the coating material filled inside towards a coating section that the coating machine has.

8. The coating material supply device according to claim 5, further comprising:

a switching section that is connected to a plurality of coating material tanks, wherein the switching section is configured to switch the coating material supplied to the coating material supply channel by connecting any one of the plurality of coating material tanks to the coating material supply channel; and a switching control unit that controls the switching section, wherein the switching section is connected to the cleaning liquid supply unit and the air supply unit, in addition to the plurality of coating material tanks.

9. A coating machine comprising:

a coating material supply device capable of cleaning at least a coating material supply channel by pumping a cleaning liquid and cleaning air into the coating material supply channel, the coating material supply device comprising:

the coating material supply channel, wherein the coating material supply channel is configured to receive a coating material supplied through the coating material supply device;

a manifold comprising a first valve, a second valve, and a third valve;

a cleaning tank for storing the cleaning liquid;

a cleaning liquid supply unit for supplying the cleaning liquid from the cleaning tank to the coating material supply channel through the first valve and the third valve along a first flow path;

a bubble generator for generating fine bubbles comprising at least one of microbubbles and nanobubbles in the cleaning liquid, wherein the bubble generator is along the first flow path between the cleaning tank and the first valve;

an air supply unit for supplying the cleaning air to the coating material supply channel through the second valve and the third valve along a second flow path; and a cleaning control unit for controlling driving of the cleaning liquid supply unit and driving of the air supply unit, wherein during cleaning, the cleaning control unit controls to alternately drive the cleaning liquid supply unit while opening the first valve and closing the second valve and the air supply unit while opening the second valve and closing the first valve to alternately supply the cleaning liquid containing the fine bubbles and the cleaning air to the coating material supply channel; and a coating section having an ejection surface arranged with a plurality of nozzles in a predetermined arrangement pattern, and coating the object to be coated by ejecting coating material supplied by the coating material supply device from each of the plurality of nozzles.

10. The coating machine of claim 9, wherein the coating material supply device further comprises:

a reservoir in which the coating material is stored; and a return flow path for returning the coating material not used at the coating section back to the reservoir via the coating material supply channel, wherein the coating material supply channel and the return flow path, together with the coating section, constitute a coating material circulation channel to circulate the coating material between the reservoir and the coating section in a coating material circulation direction, and the cleaning control unit cleans the coating material circulation channel by controlling the drive of the cleaning liquid supply unit and the drive of the air supply unit, so that the cleaning liquid and the cleaning air are sent in the same direction as the coating material circulation direction or in the opposite direction to the coating material circulation direction.

11. The coating machine of claim 10, wherein the coating material supply device further comprises:

a plurality of sorting means for partitioning the coating material circulation channel, wherein the coating material circulation channel is arranged with a plurality of circuit components, and the cleaning control unit controls any two of the plurality of sorting means so that the cleaning liquid containing the fine bubbles and the cleaning air are fed into a flow path between the any two sorting means and any circuit components of the plurality of circuit components arranged in the flow path.

* * * * *